US009489224B2

(12) United States Patent
Motoki

(10) Patent No.: US 9,489,224 B2
(45) Date of Patent: Nov. 8, 2016

(54) NETWORK VIRTUALIZATION SYSTEM, PHYSICAL NODE, AND VIRTUAL INTERFACE IDENTIFICATION METHOD IN VIRTUAL MACHINE

(75) Inventor: Akihiro Motoki, Tokyo (JP)

(73) Assignee: NEC Corporation, Tokyo (JP)

( * ) Notice: Subject to any disclaimer, the term of this patent is extended or adjusted under 35 U.S.C. 154(b) by 299 days.

(21) Appl. No.: 13/993,065

(22) PCT Filed: Oct. 4, 2011

(86) PCT No.: PCT/JP2011/073452
§ 371 (c)(1),
(2), (4) Date: Dec. 23, 2013

(87) PCT Pub. No.: WO2012/090573
PCT Pub. Date: Jul. 5, 2012

(65) Prior Publication Data
US 2014/0123140 A1    May 1, 2014

(30) Foreign Application Priority Data

Dec. 28, 2010  (JP) ................................ 2010-291500

(51) Int. Cl.
*G06F 9/45*       (2006.01)
*G06F 9/445*      (2006.01)
(Continued)

(52) U.S. Cl.
CPC ....... *G06F 9/45533* (2013.01); *H04L 41/0806* (2013.01)

(58) Field of Classification Search
CPC ................. G06F 9/45533; G06F 2009/45595; G06F 2009/4557; G06F 9/5077; G06F 11/1484; G06F 9/50
See application file for complete search history.

(56) References Cited

U.S. PATENT DOCUMENTS 8,782,365 B1 *  7/2014  Mooring et al. ............... 711/162
2005/0039180 A1 *  2/2005  Fultheim ............. G06F 9/45533
                                                                                   718/1

(Continued)

FOREIGN PATENT DOCUMENTS

JP     2005-197826 A    7/2005
JP     2006-178933 A    7/2006

(Continued)

OTHER PUBLICATIONS

Jeffrey S. Chase et al.; Dynamic Virtual Clusters in a Grid Site Manager; 2003 IEEE; 11 pages; <http://ieeexplore.ieee.org/stamp/stamp.jsp?tp=&arnumber=1210019>.*

(Continued)

*Primary Examiner* — Thuy Dao
*Assistant Examiner* — Cuong V Luu
(74) *Attorney, Agent, or Firm* — McGinn IP Law Group, PLLC

(57) ABSTRACT

A domain management apparatus instructs physical nodes about the configuration of virtual nodes and virtual links of virtual networks. The physical nodes assign a virtual machine to a virtual node based on the definition of the virtual node contained in an instruction from the domain management apparatus. The physical nodes write a configuration associating virtual interfaces in the virtual node definition with virtual NICs on the virtual machine into a configuration file of the operating system to be started up on the virtual machine before the start-up of the virtual machine and, then, start up the virtual machine. Therefore, it is possible to recognize the correspondence relation between the virtual interface in the virtual node definition and the virtual NIC in the virtual machine without referring to the virtual network assignment result and without waiting for the start-up of the virtual machine.

9 Claims, 17 Drawing Sheets

(51) Int. Cl.
*G06F 9/455* (2006.01)
*H04L 12/24* (2006.01)

(56) References Cited

U.S. PATENT DOCUMENTS

| | | | |
|---|---|---|---|
| 2005/0144594 A1* | 6/2005 | Yamazaki | H04L 41/0226 717/136 |
| 2006/0136653 A1 | 6/2006 | Traut et al. | |
| 2008/0163194 A1* | 7/2008 | Dias | G06F 9/5077 717/174 |
| 2009/0083404 A1* | 3/2009 | Lenzmeier et al. | 709/221 |
| 2009/0222542 A1* | 9/2009 | Miyajima | 709/222 |
| 2009/0327462 A1 | 12/2009 | Adams et al. | |
| 2011/0022694 A1* | 1/2011 | Dalal et al. | 709/222 |
| 2011/0314465 A1* | 12/2011 | Smith | G06F 9/5077 718/1 |
| 2012/0131579 A1* | 5/2012 | Pujolle | H04L 12/4641 718/1 |
| 2014/0123140 A1* | 5/2014 | Motoki | G06F 9/45533 718/1 |
| 2014/0157261 A1* | 6/2014 | Toeroe | G06F 11/1482 718/1 |
| 2016/0162308 A1* | 6/2016 | Chen | G06F 9/45558 718/1 |

FOREIGN PATENT DOCUMENTS

| | | |
|---|---|---|
| JP | 2009-212617 A | 9/2009 |
| JP | 2009-265894 A | 11/2009 |
| JP | 2009-302847 A | 12/2009 |
| JP | 2010-147929 A | 7/2010 |
| WO | WO 2005/064464 A2 | 7/2005 |
| WO | WO 2005/064464 A3 | 7/2005 |

OTHER PUBLICATIONS

Yong Zhu et al.; Algorithms for Assigning Substrate Network Resources to Virtual Network Components; 2006 Infocom; 12 pages; <http://www.cc.gatech.edu/computing/Networking/projects/netfinder/infocom06.pdf>.*

I. Foster et al.; Virtual Clusters for Grid Communities; 2006 IEEE; 8 pages; <http://ieeexplore.ieee.org/stamp/stamp.jsp?tp=&arnumber=1630864>.*

Ines Houidi et al.; Adaptive Virtual Network Provisioning; 2010 ACM; pp. 41-48; <http://dl.acm.org/citation.cfm?id=1851407>.*

Minlan Yuy; Rethinking Virtual Network Embedding Substrate Support for Path Splitting and Migration; 2008 ACM; pp. 17-29; <http://dl.acm.org/citation.cfm?id=1355737>.*

Raouf Boutaba et al.; Network Virtualization State of the Art and Research Challenges; 2009 IEEE; pp. 20-26; <http://ieeexplore.ieee.org/stamp/stamp.jsp?tp=&arnumber=5183468>.*

International Search Report (ISR) (PCT Form PCT/ISA/210), in PCT/JP2011/073452, dated Nov. 8, 2011.

"RSpecExample-ProtoGENI", http://www.protogeni.net/trac/protogeni/wiki/RSpecExamples#LinkRequest [downloaded Sep. 30, 2010], p. 1.

"RSpecManifestExample-ProtoGENI", http://www.protogeni.net/trac/protogeni/wiki/RSpecManifestExample [downloaded Sep. 30, 2010], pp. 1-3.

Japanese Office Action dated Oct. 20, 2015 with a partial English translation thereof.

* cited by examiner

Fig. 6

| VIRTUAL INTERFACE IDENTIFIER | VIRTUAL MAC ADDRESS |
|---|---|
| VIF-A0 | DB:20:09:81:BE:4B |
| VIF-A1 | DB:20:09:CD:09:1A |

Fig. 8

```
KERNEL=="eth*", ATTR{address}=" db:20:09:81:be:4b", NAME="VIF-A0"
KERNEL=="eth*", ATTR{address}=" db:20:09:cd:09:1a", NAME="VIF-A1"
```

Fig. 9

CONFIGURATION FILE FOR VIRTUAL INTERFACE VIF-A0

```
DEVICE=VIF-A0
HWADDR=db:20:09:81:be:4b
BOOTPROTO=dhcp
ONBOOT=yes
```

CONFIGURATION FILE FOR VIRTUAL INTERFACE VIF-A1

```
DEVICE=VIF-A1
HWADDR=db:20:09:cd:09:1a
BOOTPROTO=dhcp
ONBOOT=yes
```

Fig. 10

VIRTUAL MACHINE START-UP PARAMETER 150

```
/usr/bin/qemu-kvm
-S -M pc-0.11 -m 2048 -smp 1 -name Node-A
-uuid eb931f1a-0822-6dab-14f5-6bc2ab697cb2
-monitor unix:/var/lib/libvirt/qemu/Node-A.monitor,server,nowait
-serial pty -parallel none -usb -vnc 0.0.0.0:2 -k ja -vga cirrus -soundhw es1370
-boot c
-drive file=,if=ide,media=cdrom,index=2
-drive file=/var/lib/libvirt/images/VM.img,if=virtio,index=0,boot=on,format=raw
-net nic,macaddr=db:20:98:81:be:4b,vlan=1,model=virtio,name=virtio.1       151
-net tap,fd=22,vlan=1,name=tap.1
-net nic,macaddr=db:20:98:cd:09:1a,vlan=2,model=virtio,name=virtio.2       152
-net tap,fd=23,vlan=2,name=tap.2
```

Fig. 11

```
<rspec>                                     VIRTUAL NETWORK ASSIGNMENT RESULT
   <link>
   ...
   </link>
   <link>
   ...
   </link>
   <node>
      <component_manager_uuid>urn:publicid:IDN+emulab.net ...</component_manager_uuid>
      <component_uuid>de980246-773e-102b-8eb4-......</component_uuid>
      <exclusive>1</exclusive>
      <node_type>
         <type_name>pc</type_name>
         <type_slots>1</type_slots>
      </node_type>
      <sliver_uuid>de980246-773e-102b-8eb4-001143e453fe</sliver_uuid>
      <virtual_id>Node-A</virtual_id>                    VIRTUAL NODE
      <virtualization_type>raw</virtualization_type>     INFORMATION (Node-A)
   </node>
   <node>
      ...
      <virtual_id>Node-B</virtual_id>
      ...
   </node>
   <node>
      ...
      <virtual_id>Node-C</virtual_id>
      ...
   </node>
   <type>request</type>
   <valid_until>2009-08-03T20:53:19</valid_until>
   <xmlns>http://www.protogeni.net/resources/rspec/0.1</xmlns>
</rspec>
```

```
<node>
<component_manager_uuid>urn:publicid:IDN+emulab.net ...</component_manager_uuid>
<component_uuid>de980246-773e-102b-8eb4-......</component_uuid>
<exclusive>1</exclusive>
<node_type>
    <type_name>pc</type_name>
    <type_slots>1</type_slots>
</node_type>
<sliver_uuid>de980246-773e-102b-8eb4-0011143e453fe</sliver_uuid>
<virtual_id>Node-A</virtual_id>
<virtualization_type>raw</virtualization_type>
</node>
```

Fig. 13

```
<node virtual_id="Node-A" virtualization_type="emulab-vnode" exclusive="1">
<node_type type_name="pc" type_slots="1"/>
<interface virtual_id="VIF-A0"/>
<interface virtual_id="VIF-A1"/>
</node>
```
131

VIRTUAL NODE DEFINITION

Fig. 16

```
<?xml version="1.0" encoding="UTF-8"?>
<rspec xmlns="http://www.protogeni.net/resources/rspec/0.1"
    xmlns:xsi="http://www.w3.org/..."
    xsi:schemaLocation="http://...."
    type="request" >

<node virtual_id="Node-A" virtualization_type="emulab-vnode" exclusive="1">
    <node_type type_name="pc" type_slots="1"/>
    <interface virtual_id="VIF-A0"/>
    <interface virtual_id="VIF-A1"/>
  </node>                                            VIRTUAL NODE DEFINITION    131

<node virtual_id="Node-B" virtualization_type="emulab-vnode" exclusive="1">
    <node_type type_name="pc" type_slots="1"/>
    <interface virtual_id="VIF-B0"/>
    <interface virtual_id="VIF-B1"/>
  </node>                                            VIRTUAL NODE DEFINITION    132

<node virtual_id="Node-C" virtualization_type="emulab-vnode" exclusive="1">
    <node_type type_name="pc" type_slots="1"/>
    <interface virtual_id="VIF-C0"/>
    <interface virtual_id="VIF-C1"/>
  </node>                                            VIRTUAL NODE DEFINITION    133

<link virtual_id="Link-AB">
    <interface_ref virtual_node_id="Node-A" virtual_interface_id="VIF-A0" />
    <interface_ref virtual_node_id="Node-B" virtual_interface_id="VIF-B1" />
  </link>

<link virtual_id="Link-BC">
    <interface_ref virtual_node_id="Node-B" virtual_interface_id="VIF-B0" />
    <interface_ref virtual_node_id="Node-C" virtual_interface_id="VIF-C1" />
  </link>

<link virtual_id="Link-CA">
    <interface_ref virtual_node_id="Node-C" virtual_interface_id="VIF-C0" />
    <interface_ref virtual_node_id="Node-A" virtual_interface_id="VIF-A1" />
  </link>

</rspec>                                            VIRTUAL NETWORK DEFINITION
```

```
<rspec>
 <link>
  ...
 </link>
 <link>
  ...
 </link>
 <node>
  <component_manager_uuid>urn:publicid:IDN+emulab.net ...</component_manager_uuid>
  <component_uuid>de980246-773e-102b-8eb4-......</component_uuid>
  <exclusive>1</exclusive>
  <interface>                                    VIRTUAL INTERFACE    142
   <component_id>eth1</component_id>             INFORMATION
   <virtual_id>VIF-A0</virtual_id>
  </interface>
  <interface>                                    VIRTUAL INTERFACE    143
   <component_id>eth0</component_id>             INFORMATION
   <virtual_id>VIF-A1</virtual_id>
  </interface>
  <node_type>                                                 141
   <type_name>pc</type_name>
   <type_slots>1</type_slots>
  </node_type>
  <sliver_uuid>de980246-773e-102b-8eb4-001143e453fe</sliver_uuid>
  <virtual_id>Node-A</virtual_id>
  <virtualization_type>raw</virtualization_type>
                                                  VIRTUAL NODE INFORMATION
 </node>
 <node>
  ...
 </node>                                                     140
 <node>
  ...
 </node>
 <type>request</type>
 <valid_until>2009-08-03T20:53:19</valid_until>
 <xmlns>http://www.protogeni.net/resources/rspec/0.1</xmlns>
</rspec>
```

NETWORK VIRTUALIZATION SYSTEM, PHYSICAL NODE, AND VIRTUAL INTERFACE IDENTIFICATION METHOD IN VIRTUAL MACHINE

TECHNICAL FIELD

The present invention relates to an operating method of a network virtualization system, and in particular to a virtual interface identification method in a virtual machine to be assigned to a virtual network node constituting a virtual network.

BACKGROUND ART

In recent years, as networks become larger, the management and operation of networks are getting more complicated. As a result, for example, the management of a network is conducted in such a manner that one of the apparatuses constituting the network undertakes a task of configuring another apparatus and configures that apparatus on behalf of the administrator (for example, see Patent literatures 1 and 2).

Further, the management of a network is conducted in such a manner that instead of using the physical network constituting the network as it is, a virtual network(s) is constructed and used on the physical network for the purpose of the management or for securing the security.

In a system in which a virtual network(s) is formed (network virtualization system), it is possible to construct one or more than one virtual network on one physical network. Further, the constructed virtual networks can be operated without having any effect on each other. Therefore, for example, it is possible to carry out a network experiment by a network researcher and to provide network service by a network service provider on the same physical network without having any effect on each other. The network virtualization system like this is getting attention in various network fields.

FIG. 15 shows a typical overall configuration of a network virtualization system. The implementation of network virtualization systems has been researched and developed by the GENT project (U.S.), the FIRE project (Europe), and so on. FIG. 15 is a block diagram showing an outline of such network virtualization systems. The network virtualization system 91 includes a plurality of physical nodes 92 that provide computing resources, physical links 93 connecting these physical nodes 92 with one another, and a domain management apparatus 94.

In the example shown in FIG. 15, virtual networks 95 are constructed on the network virtualization system 91. Similar to physical networks, each of the virtual networks 95 is composed of network nodes and network links (hereinafter, network nodes and network links on a virtual network are referred to as "virtual nodes 96" and "virtual links 97" respectively).

In FIG. 15, the resources of the physical nodes 92 are allocated to each of the virtual nodes 96 on the virtual networks 95. A plurality of virtual machines operate on the physical nodes 92, and the allocation of resources to the virtual nodes 96 is implemented by assigning these plurality of virtual machines to the respective virtual nodes 96.

Further, though not shown in FIG. 15, physical network resources on the network virtualization system 91 are allocated to the virtual links 97 that connect these virtual nodes 96 with one another. In general, this allocation to the virtual links 97 is implemented by using a VLAN or a tunneling technique such as GRE (Generic Routing Encapsulation), IPSec, and MPLS (Multi Protocol Label Switching).

The domain management apparatus 94 manages the resources of all the physical nodes 92 and the physical links 93 on the network virtualization system 91. When the domain management apparatus 94 receives a request to create a virtual network 95 from a setting terminal 98, the domain management apparatus 94 determines the resource allocation to the physical nodes 92 and the physical links 93 based on the creation request, and instructs each of the physical nodes 92 about the VM (Virtual Machine) assignment to the virtual node and the creation/assignment of the virtual link. Then, when the domain management apparatus 94 confirms the completion of the assignment in each physical node 92, the domain management apparatus 94 notifies the virtual network assignment result to the setting terminal 98.

When a virtual network 95 is to be created, the setting terminal 98 supplies a virtual network definition to the domain management apparatus 94. In the "virtual network definition", resources that should be secured for the virtual nodes 96 and the virtual links 97 as well as the topology of the virtual network 95 to be constructed are specified. Further, various forms of virtual network definitions have been used. A specific example of a virtual network definition is disclosed in ProtoGENI RSpec of Non-patent literature 1.

FIG. 16 shows an example of a virtual network definition according to Non-patent literature 1. In the virtual network definition 13 shown in FIG. 16, the definitions of virtual nodes 96 (virtual nodes 131 to 133) are indicated by dotted-line boxes, and each definition is a part between "<node>" and "</node>" of the XML. The definition of each virtual node 96 includes a "virtual_id" attribute indicating the identifier of the virtual node, a <node_type> element indicating the type of the virtual node, and a <interface> definition, which is the definition of the network interface(s) of the virtual node (hereinafter, simply referred to as "virtual interface").

The same number of virtual interface definitions as the number of the virtual interfaces are included. In the example shown in FIG. 16, each of Node-A to Node-C has two virtual interfaces. Therefore, there are two definitions <interface> for virtual interfaces in each of the virtual node definitions. The name of a virtual interface is indicated by using the attribute "virtual_id" of the <interface> element of the XML. In the example shown in FIG. 16, Node-A has two virtual interfaces having names "VIF-A0" and "VIF-A1" respectively.

Virtual links 97 that connect the virtual nodes 96 with one another on the virtual network 95 are defined by using <link> elements. In the above-mentioned ProtoGENI RSpec, each virtual link 97 is defined in such a manner that the virtual link 97 is defined by specifying the virtual interfaces of virtual nodes 96 connected to the both ends of the virtual link 97. In the virtual network definition 13 shown in FIG. 16, a virtual link Link-AB connects the virtual interface VIF-A0 of Node-A with the virtual interface VIF-B1 of Node-B.

As described above, upon receiving the virtual network definition from the setting terminal 98, the domain management apparatus 94 interprets the received virtual network definition. Then, the domain management apparatus 94 determines, for the virtual nodes 96 and the virtual links 97 that are necessary for the creation of the virtual network 95, the resources of the physical nodes 92 and the physical links 93 that should be allocated to the virtual nodes 96 and the virtual links 97 based on the available resources of the physical nodes 92 and the like as well as the requested quality requirements and the like.

Next, the domain management apparatus 94 instructs each physical node 92 about the resource allocation to the virtual nodes 96. When a physical node 92 receives a request for allocation to the virtual node 96, the physical node 92 assigns an unused virtual machine (VM) on the physical node 92 to the virtual node 96 based on the received virtual node definition, and returns the assignment result to the domain management apparatus 94. With regard to the virtual network definition, the domain management apparatus 94 also instructs physical nodes 92 other than the physical node 92 that is determined as the resource allocating physical nodes about the resource allocation to the virtual nodes 96 in a similar manner, and waits for the reply to the allocation requests.

Further, with regard to the assignment of the virtual links 97, the domain management apparatus 94 also instructs relevant physical nodes 92 about the resource allocation of the physical links 93 in a similar manner, and waits for the reply to the allocation requests.

With regard to the virtual network definition, when all the resources required for the creation of the necessary virtual nodes 96 and the virtual links 97 are secured and then the virtual network 95 is thereby constructed, the domain management apparatus 94 notifies the virtual network assignment result to the setting terminal 98.

The virtual network assignment result can be also expressed in various data formats. FIG. 17 shows an example of the assignment result disclosed in Non-patent literature 2. Note that for the sake of explanation, only the result of one virtual node Node-A is extracted for the illustration in the result shown in FIG. 17 (in FIG. 17, it is represented as virtual node information 140, which is indicated by a dotted-line box).

The virtual node information 140 shown in FIG. 17 represents an assignment result for the virtual node Node-A. A virtual node identifier 141 indicates that the virtual node information 140 is an assignment result corresponding to the virtual node Node-A defined in the virtual network definition. Virtual interface information 142 and 143 are assignment results corresponding to the virtual interfaces of Node-A.

In each of the virtual interfaces (virtual interfaces 142 and 143), the assignment of a virtual NIC of the virtual machine is included in an area between "<component_id>" and "</component_id>", and the assignment of a virtual interface is included in an area between "<virtual_id>" and "</virtual_id>". Network Interface Card (NIC) is assigned to each of the virtual interfaces, indicating that NIC "eth1" and NIC "eth0" of the virtual machine correspond to VIF-A0 and VIF-A1, respectively, of the virtual interface.

A program running on a virtual node 96 connected to the virtual network 95 can recognize which of the virtual NICs on the virtual machine corresponds to the virtual interface by referring to the virtual interface information 142 or the virtual interface information 143.

In this manner, in the network virtualization system 91 shown in FIG. 15, upon receiving a request from the setting terminal 98, the domain management apparatus 94 can construct a virtual network(s) 95 by configuring the physical nodes 92.

Note that in the following explanation, a network interface of a virtual node 96 in the virtual network definition is referred to as "virtual interface" and a network interface card (NIC) of a virtual machine assigned to a virtual node 96 is referred to as "virtual NIC".

CITATION LIST

Patent Literature

PTL1: Japanese Unexamined Patent Application Publication No. 2005-197826
PTL2: Japanese Unexamined Patent Application Publication No. 2009-302847
PTL3: Japanese Unexamined Patent Application Publication No. 2009-212617

Non Patent Literature

NPL1: "RSpecExample-ProtoGENI", http://www.protogeni.net/trac/protogeni/wiki/RSpecExamples#LinkRequest
NPL2: "RSpecManifestExample-ProtoGENI", http://www.protogeni.net/trac/protogeni/wiki/RSpecManifestExample

SUMMARY OF INVENTION

Technical Problem

In general, what kind of names are used to refer to NICs is different depending on the operating system (OS) of the computer regardless of whether the computer is a virtual machine or not. Further, the names of NICs are also changed depending on the recognition order of the NICs upon the start-up of the OS. In addition, the recognition order of NICs upon the start up of the OS is different from one start-up to another. That is, even the recognition order of NICs is not determined.

Therefore, when an OS running on a virtual machine defines the name of a NIC, the name of that NIC is fixedly decided after the OS has started up. For example, in a computer equipped with two NICs, when "eth0" and "eth1" are assigned to these two NICs upon the start-up of the OS, which of the NICs is assigned with the name "eth0" is changed depending on the recognition order of the NICs by the OS.

Therefore, there have been the following problems in the network virtualization system 91 to which the present invention relates.

A program running on a virtual machine that is assigned on a virtual network needs to recognize the correspondence between virtual interfaces and the names of virtual NICs (device names) in the virtual network in order to use the virtual network. However, a program running on an ordinary virtual machine cannot recognize the correspondence between virtual interfaces and virtual NICs. Therefore, for example, there is a problem that a physical node in the network virtualization system 91 needs to notify the virtual network assignment result, in particular the name of virtual NICs corresponding to virtual interfaces to programs running on the virtual machine.

Further, in a physical node of the network virtualization system 91, the correspondence between virtual interfaces and virtual NICs is not fixedly determined until the start-up of the OS running on the virtual machine has been completed. As a result, there is a problem that the physical node of the network virtualization system 91 cannot return the configuration result to the domain management apparatus 94 until the OS running on the virtual machine has started up.

Further, since the start-up of the OS running on the virtual machine is indispensable to know the correspondence between virtual interfaces and virtual NICs, there is a problem that the creation of a virtual network cannot be reserved in advance in the network virtualization system 91.

Incidentally, as another technique relating to the present invention, Patent literature 3 discloses a function of assigning a MAC address to a virtual NIC of the virtual machine. However, Patent literature 3 merely discloses that a host OS (server) specifies a MAC address to be assigned to a virtual NIC of a virtual machine, and therefore does not solve the above-described problems.

Solution to Problem

An object of the present invention is to solve the above-described problems, and to provide a network virtualization system capable of recognizing the correspondence relation between a virtual interface and a virtual NIC without referring to the virtual network assignment result and without waiting for the start-up of the virtual machine.

A network virtualization system according to a first aspect of the present invention includes: a physical node constituting a network; and a domain management apparatus that instructs the physical node about a configuration of a virtual node and a virtual link of a virtual network, in which when the physical node assigns a virtual machine to the virtual node based on a definition of the virtual node contained in an instruction from the domain management apparatus, the physical node writes a configuration associating information contained in the virtual node definition with information about the virtual machine into a configuration file of an operating system to be started up on the virtual machine before start-up of the virtual machine and, after that, starts up the virtual machine.

As a result, it is possible to recognize the correspondence relation between information contained in a virtual node assignment request and information about the virtual machine without referring to the virtual network assignment result and without waiting for the start-up of the virtual machine.

A physical node according to a second aspect of the present invention includes: a virtual node definition interpretation unit that receives a virtual node assignment request and interprets a definition of the assignment-requested virtual node; a resource allocation unit that receives a result from the virtual node definition interpretation unit, checks a resource to be allocated to the virtual node, and assigns a virtual machine; a virtual machine parameter generating unit that assigns a value to a MAC address of a virtual NIC of the virtual machine, the value being unique at least within the virtual machine; a virtual disk manipulating unit that writes a configuration associating information contained in the virtual node assignment request with information about the virtual machine into a configuration file of an operating system to be started up on the virtual machine before start-up of the virtual machine, the configuration file being stored in a virtual disk of the virtual machine; and a virtual machine monitor unit that performs execution control of the virtual machine.

As a result, it is possible to recognize the correspondence relation between information contained in a virtual node assignment request and information about the virtual machine without referring to the virtual network assignment result and without waiting for the start-up of the virtual machine.

A virtual interface identification method in a virtual machine according to a third aspect of the present invention includes: a step of receiving, by a physical node constituting a network, a virtual node assignment request including a definition of a virtual interface held by a virtual node, and interpreting the definition of the assignment-requested virtual node; a step of receiving, by the physical node, a result of the virtual node definition interpretation step, checking a resource to be allocated to the virtual node, and assigning a virtual machine; a step of associating, by the physical node, a virtual NIC of the virtual machine with each of the virtual interface included in the virtual node assignment request one by one, and assigning a value to a MAC address of the virtual NIC, the value being unique at least within the virtual machine; and a step of writing, by the physical node, a rule associating the virtual interface included in the virtual node assignment request with a MAC address assigned to the virtual NIC of the virtual machine into a configuration file of interface mapping means of an operating system to be started up on the virtual machine before start-up of the virtual machine, the configuration file being stored in a virtual disk of the virtual machine.

As a result, it is possible to recognize the correspondence relation between the virtual interface and the virtual NIC in the virtual machine without referring to the virtual network assignment result and without waiting for the start-up of the virtual machine.

Advantageous Effects of Invention

According to the present invention, it is possible to provide a network virtualization system, a physical node, and a virtual interface identification method in a virtual machine capable of recognizing the correspondence relation between a virtual interface and a virtual NIC in the virtual machine without referring to the virtual network assignment result and without waiting for the start-up of the virtual machine.

BRIEF DESCRIPTION OF DRAWINGS

FIG. 6 shows an example of a correspondence table of virtual MAC addresses for a first exemplary embodiment of the present invention;

FIG. 8 shows an example (in the case of reference URL1) of a configuration file of interface mapping means according to a first exemplary embodiment of the present invention;

FIG. 9 shows an example (in the case of reference URL2) of a configuration file of interface mapping means according to a first exemplary embodiment of the present invention;

FIG. 10 shows an example of start-up parameter of a virtual machine according to a first exemplary embodiment of the present invention;

FIG. 11 shows an example of a virtual network assignment result according to a first exemplary embodiment of the present invention;

FIG. 12 shows an example of a virtual node assignment result according to a first exemplary embodiment of the present invention;

FIG. 13 shows an example of a definition of a virtual node according to a first exemplary embodiment of the present invention;

FIG. 16 shows an example of a typical virtual network definition;

FIG. 17 shows an example of a typical virtual network assignment result; and

DESCRIPTION OF EMBODIMENTS

Prior to the explanation of exemplary embodiments of the present invention, a principle of the present invention is explained with reference to FIG. 18.

Figure 18:
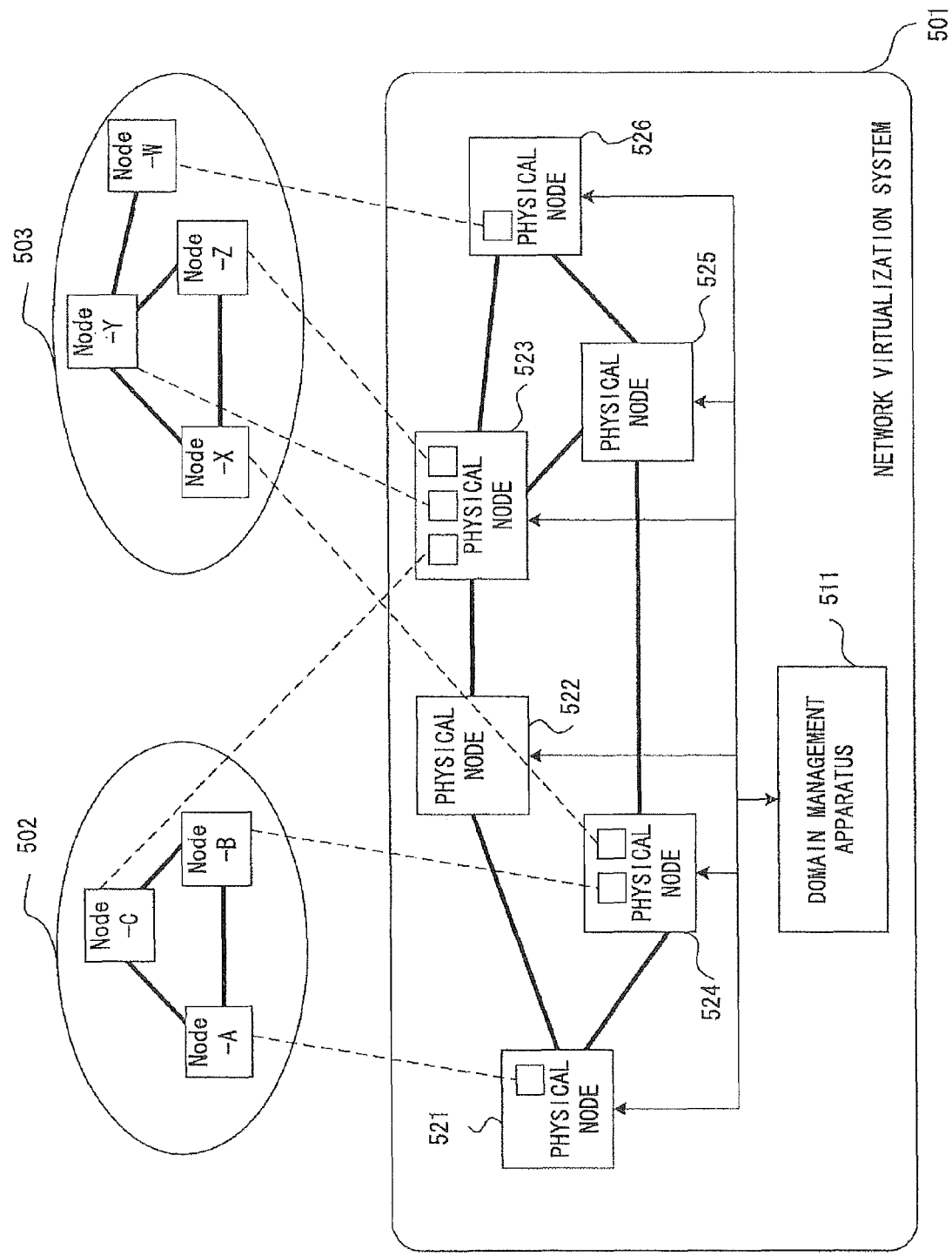
FIG. 18 is a diagram for explaining a principle of the present invention.

FIG. 18 shows a network virtualization system 501 including physical nodes 521 to 526 constituting a network, and a domain management apparatus 511.

The domain management apparatus 511 instructs the physical nodes 521 to 526 about the configuration of virtual nodes and virtual links of virtual networks 502 and 503.

The physical nodes 521 to 526 assign a virtual machine to a virtual node based on the definition of the virtual node contained in an instruction from the domain management apparatus 511. The physical nodes 521 to 526 write a configuration associating information contained in the virtual node definition with information about the virtual machine into a configuration file of the operating system to be started up on the virtual machine before the start-up of the virtual machine and, after that, start up the virtual machine.

First Exemplary Embodiment

Exemplary embodiments of the present invention are explained hereinafter with reference to the drawings. In the following explanation, an overall configuration of a network system, a configuration of a physical node, and an operation of the physical node according to this exemplary embodiment are explained one by one. Note that in the following explanation, a node on a virtual network is simply referred to as "virtual node", and a link on a virtual network is simply referred to as "virtual link".

<Overall Configuration of Network System>

Figure 1:
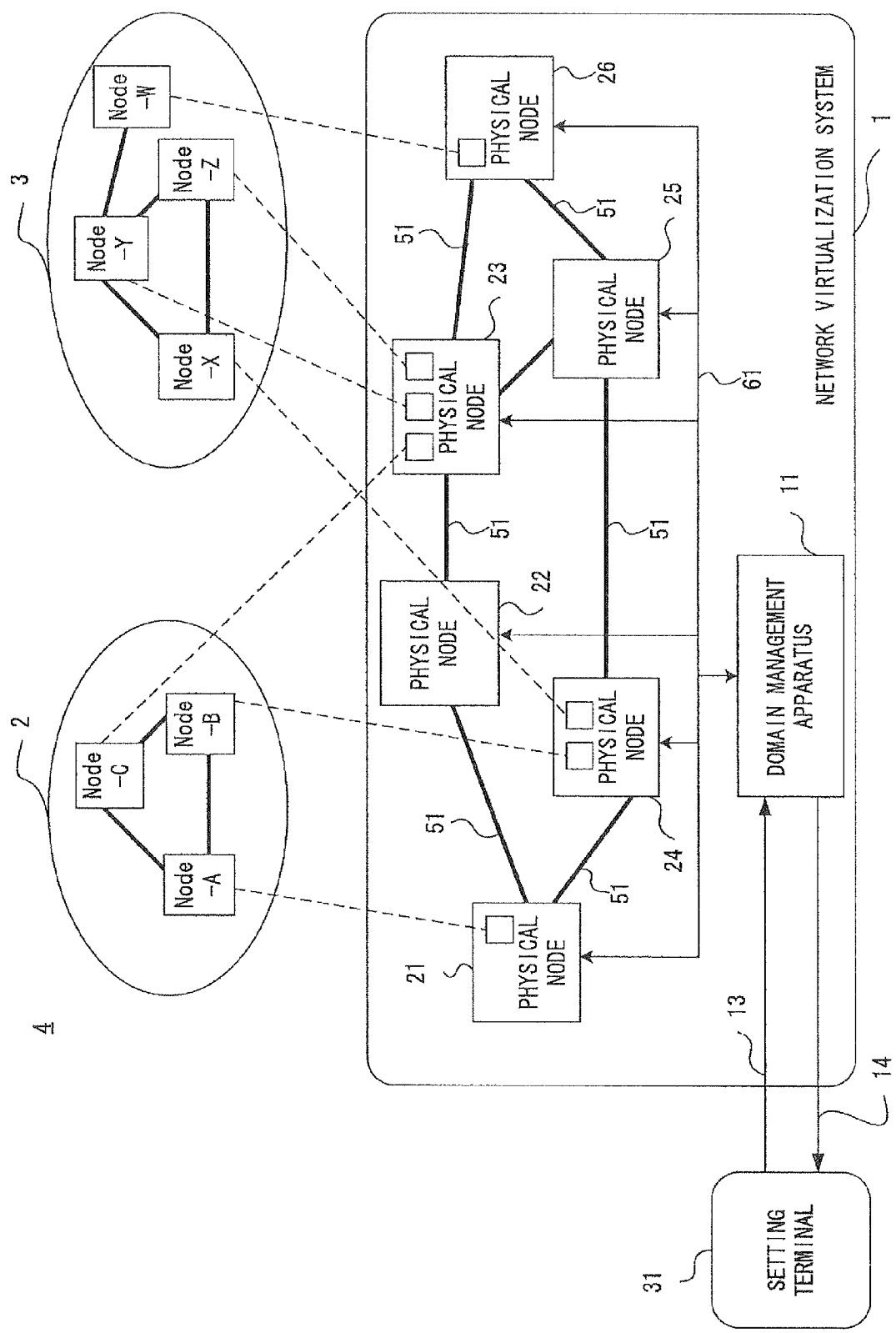
FIG. 1 is a block diagram showing a network virtualization system according to a first exemplary embodiment of the present invention.

FIG. 1 is a block diagram showing an example of an overall configuration of a network system 4 including a network virtualization system 1 according to this exemplary embodiment of the present invention.

The network system 4 includes a setting terminal 31 and the network virtualization system 1.

The setting terminal 31 sends an instruction to create a virtualized network to the network virtualization system 1 under an instruction from another apparatus (not shown) or a system administrator in order to implement the network virtualization system 1. The virtualized network creation instruction includes a virtual network definition 13 (which is explained later).

The network virtualization system 1 receives an instruction from the setting terminal 31 and constructs a virtual network(s) (virtual networks 2 and 3) including virtual nodes and virtual links by using the resources of physical nodes (physical nodes 21 to 26) and physical links 51. The network virtualization system 1 returns the construction result of the virtual network to the setting terminal 31. The virtual network construction result includes a virtual network assignment result 14 (which is explained later). Details of the construction of the virtual networks 2 and 3 are explained later. Note that in FIG. 1, an example of the correspondence between the physical nodes and the virtual nodes is indicated by dotted lines.

Figure 2:
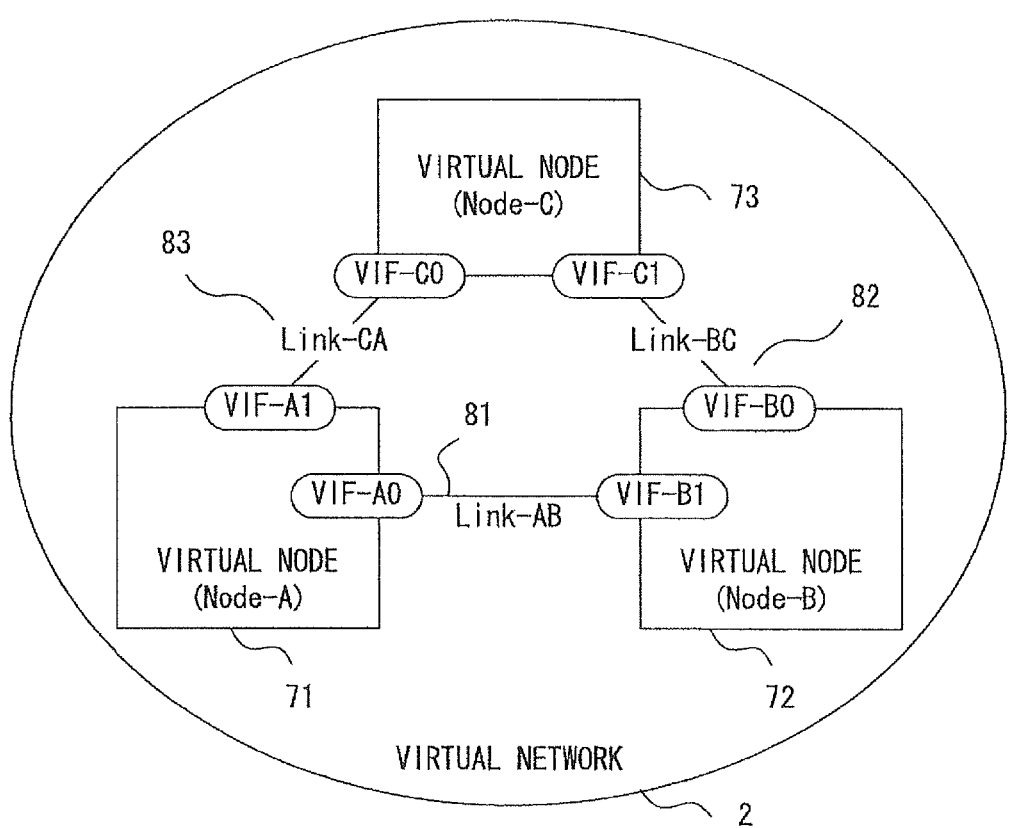
FIG. 2 is a configuration example of a virtual network according to a first exemplary embodiment of the present invention.

The virtual network 2 is explained in a more detailed manner with reference to FIG. 2. FIG. 2 shows an example of a configuration of the virtual network 2 shown in FIG. 1 in a more detailed manner.

In general, a virtual network includes at least two virtual nodes and at least one virtual link. Further, each virtual node includes at least one virtual NIC (Network interface Circuit or Card) for the connection to a virtual link. The virtual network performs communication by using the virtual link.

FIG. 2 shows a configuration example of a virtual network 2 including three virtual nodes and three virtual links. For example, a virtual network 71 (Node-A) connects to a virtual node 72 (Node-B) through a virtual NIC (VIF-A0) and a virtual link 81 (Link-AB), and also connects to a virtual node 73 (Node-C) through a virtual NIC (VIF-A1) and a virtual link 83 (Link-CA). Similarly, the virtual nodes 72 and 73 connect to each other through a virtual link 82 (Link-BC). Note that the virtual network 2 according to this exemplary embodiment may include a virtual node including no virtual link, i.e., the so-called "stand-alone" virtual node.

Referring to FIG. 1 again, the network virtualization system 1 is explained in a more detailed manner.

The network virtualization system 1 includes a domain management apparatus 11, at least one physical node (physical nodes 21 to 26), and a physical link(s) 51.

The domain management apparatus 11 receives a configuration of a virtual network from the setting terminal 31, instructs the physical nodes 21 to 26, and thereby constructs a virtual network that the network virtualization system 1 is requested to construct. The domain management apparatus 11 also returns a construction result to the setting terminal 31.

However, the configuration implemented by the domain management apparatus 11 is not limited to these operations. For example, although the domain management apparatus 11 does not assign any physical node (i.e., virtual node) that serves as a virtual relay link on the virtual network, the domain management apparatus 11 provides an instruction about the assignment of a virtual link to a physical node that assigns the virtual link.

The physical links 51 connect the physical nodes 21 to 26 with one another. Further, resources of the physical links 51 are allocated to the virtual links. Note that ordinary network links may be used for the physical links 51 according to this exemplary embodiment. Further, the physical links 51 may be either wired links or wireless links, or a combination of wired links and wireless links. Furthermore, there are no particular restrictions on the connection method. Therefore, detailed explanation of the physical links 51 is omitted here.

A setting path 61 is a communication path between the domain management apparatus 11 and the physical nodes 21 to 26. The domain management apparatus 11 provides instructions about the configuration to the physical nodes 21 to 26 and receives their results from the physical nodes 21 to 26 through the setting path 61. In FIG. 1, for the sake of explanation, the setting path 61 is illustrated as a separate component from the physical links 51. However, the present invention is not limited to this configuration, and part or all of the physical links 51 may be used as the setting path 61. Note that since an ordinary network link may be used for the setting path 61, its detailed explanation is omitted here.

The physical nodes 21 to 26 are connected with one another by using the physical links 51 and thereby constitute a physical network. There is no restriction on the number of physical links 51 to which each of the physical nodes 21 to 26 connects (however, each of the physical nodes 21 to 26 connects to at least one physical link 51). That is, the only requirement is that each of the physical nodes 21 to 26 is connected to another physical node by using a physical link 51. In the FIG. 1, as an example, each of the physical nodes 23 and 25 connects to three physical links 51, while each of the physical nodes 21, 22, 24 and 26 connects to two physical links 51.

Further, in each of the physical nodes 21 to 26, a virtual machine(s) (hereinafter, also referred to as "VM (Virtual Machine)") to which the physical node has allocated a part of its resources operates under instructions from the domain management apparatus 11. On this virtual machine, an operating system (hereinafter referred to as "OS (Operating System)") and an application program(s) (hereinafter referred to as "AP program") are running. The physical nodes 21 to 26 implement a virtual node by using this virtual machine.

The network virtualization system 1 implements a virtual network (e.g., virtual network 2 shown in FIG. 1) by using a virtual node(s) like this and a physical link(s) based on the physical links 51.

In the FIG. 1, as an example, one virtual machine is operating on the physical nodes 21 and 26; three virtual machines are operating on the physical node 23; two virtual machines are operating on the physical node 24; and no virtual machine is operating on the other physical nodes. Note that in FIG. 1, with regard to the assignments between the virtual machines and the virtual nodes of the virtual network according to this exemplary embodiment, their correspondence relations are, as an example, indicated by dotted lines.

Each of the physical nodes 21 to 26 according to this exemplary embodiment may individually receive an instruction from the domain management apparatus 11, or two or more physical nodes may receive a common instruction. Further, the number of the physical nodes in the network virtualization system 1 according to this exemplary embodiment is not limited to six. The number of the physical nodes may be less than six or greater than six. Furthermore, the number of the virtual networks constructed on the network virtualization system 1 is also not limited to two, and the number of virtual networks may be one or greater than two.

<Configuration of Physical Node>

Next, a configuration of a physical node is explained with reference to FIG. 3. Note that although this exemplary embodiment is explained on the assumption that each of the physical nodes 21 to 26 of the network virtualization system 1 has the same configuration, the physical nodes 21 to 26 do not necessarily have to have the same configuration. Each of the physical nodes 21 to 26 may be an apparatus (node) having other configurations, provided that it can implement the operations explained below. The following explanation is made by taking the physical node 21 as an example.

Figure 3:
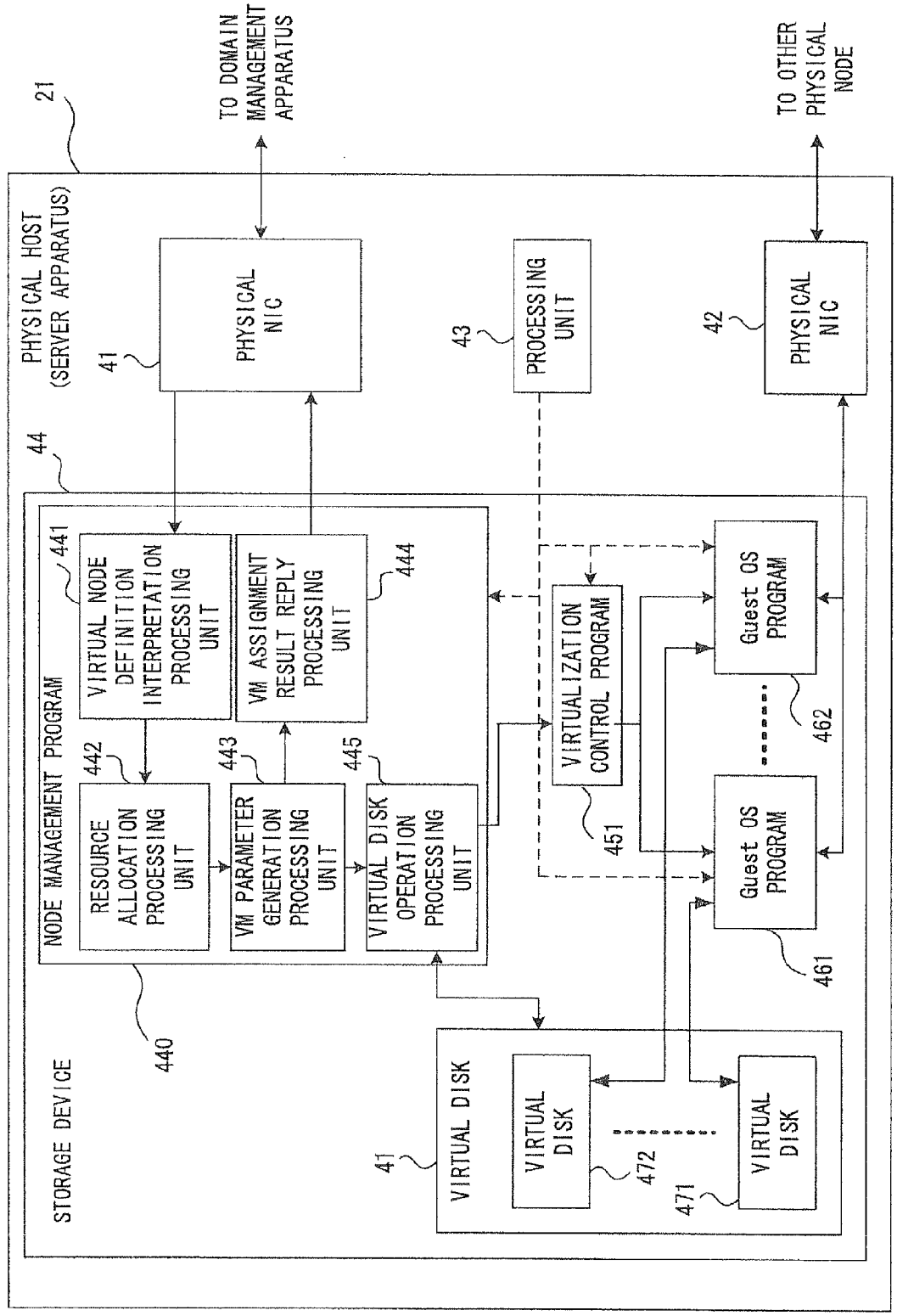
FIG. 3 shows a configuration of a physical node according to a first exemplary embodiment of the present invention.
Figure 4:
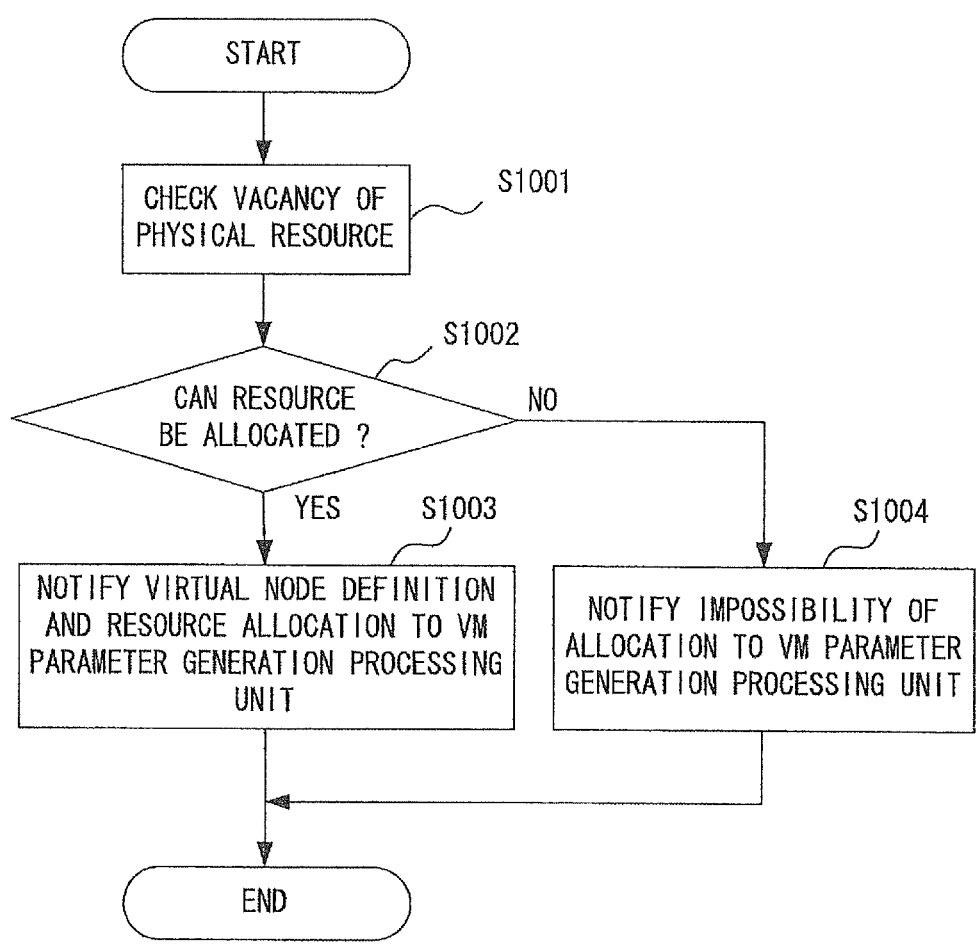
FIG. 4 shows an operation flow of a resource allocation unit according to a first exemplary embodiment of the present invention.

FIG. 3 shows an example of a configuration of the physical node 21 according to this exemplary embodiment. Note that in the following explanation, although the physical node 21 is described as a typical computer apparatus such as a server apparatus for the sake of explanation, the physical node 21 is not limited to this example.

The physical node 21 includes a physical NIC 41, a physical NIC 42, a processing unit 43, and a storage device 44. Note that the physical node 21 shown in FIG. 3 includes two physical NICs. This is simply because, two physical NICs, each of which performs a different operation, are explained in the following explanation. The number of physical NICs in the physical node 21 according to this exemplary embodiment is not limited to two, and the number of physical NICs may be one or greater than two.

The physical NICs 41 and 42 connect to other apparatuses through the physical links 51. There is no restriction on the apparatuses or components to which the physical NICs 41 and 42 according to this exemplary embodiment connect. However, the following explanation is made on the assumption that the physical NIC 41 connects to the domain management apparatus 11 and the physical NIC 42 connects to other physical nodes for the sake of explanation. That is, the virtual link according to this exemplary embodiment is implemented by using the resource of the physical link 51 connected to the physical NIC 42.

The processing unit 43 includes an information processing unit (e.g., CPU (Central Processing Unit)) and a storage device, and performs the processing of the physical node 21. More specifically, the processing unit 43 executes a program(s) stored in the storage device 44 (which is explained later).

The storage device 44 stores a program(s) that is executed by the processing unit 43 in order to realize this exemplary embodiment. Further, the storage device 44 stores virtual disks 471 and 472. The storage device 44 may be also used as a work area that the processing unit 43 uses to execute a program.

Note that although there is only one storage device 44 in the configuration shown in FIG. 3, the present invention is not limited to this configuration. That is, the storage device 44 may include a plurality of storage devices. The storage device 44 may be implemented by using a storage device such as a memory and a disk. Typically, the program on the storage device 44 is stored in a memory, and the virtual disks 471 and 472 are stored in a disk. However, other arbitrary storage devices may be also used as the storage device 44 according to the present invention.

The program on the storage device 44 according to this exemplary embodiment includes a node management program 440, a virtualization control program 451, and Guest OS programs 461 and 462.

The node management program 440 is a program that is used to implement a virtual node. The node management program 440 allocates resources to virtual nodes and virtual links under instructions from the domain management apparatus 11. Further, the node management program 440 also instructs the virtualization control program 451 (which is described later) to start up and discard a virtual machine that is used to implement a virtual node.

To that end, the node management program 440 includes a virtual node definition interpretation processing function, a resource allocation processing function, a VM parameter generation processing function, a VM assignment result reply processing function, and a virtual disk operation function. The node management program 440 may include these functions as separate programs, or may include two or more functions as one program. These processing functions are explained later in a more detailed manner.

Note that although the node management program 440 is described as a program running on a computer in the physical node 21 according to this exemplary embodiment, the present invention is not limited to this configuration. That is, some or all of the processes of the node management program 440 (which are explained later) may be implemented by using an apparatus or a circuit that performs equivalent operations.

The virtualization control program 451 corresponds to a program called "Hypervisor program" or "virtual machine program", and is a control program used to implement a virtual machine. The virtualization control program 451 receives an instruction including start-up parameters of a virtual machine from the node management program 440, and thereby starts up and discards the virtual machine. Further, the virtualization control program 451 controls reading/writing of the virtual disks 471 and 472 by using a virtual machine (Guest OS programs 461 and 462).

The physical node 21 implements a virtual node by using a virtual machine that is started up by the virtualization control program 451. Further, the virtualization control program 451 may perform controls including the starting-up and discarding of a program(s) on a VM (Guest OS programs 461 and 462) (which is described later). Note that an ordinary Hypervisor program may be used for the virtualization control program 451 according to this exemplary embodiment, and therefore its detailed explanation is omitted here.

The Guest OS programs 461 and 462 are an example of the programs running on a virtual machine that is started up by the virtualization control program 451. When a virtual machine is assigned to a virtual node, the Guest OS program 461 becomes a program running on the virtual node.

If necessary, the Guest OS programs 461 and 462 can connect to a program running on another virtual node by using a virtual link and thereby perform data communication with the program. The virtual link is connected to a virtual NIC that is implemented by using the physical NIC 42. Note that the Guest OS programs 461 and 462 may connect to a program running on the same physical node 21 by using a loop-back technique.

In this exemplary embodiment, the Guest OS programs 461 and 462 is an OS running on a virtual machine (hereinafter called "virtual machine OS"). The Guest OS program 461 can read/write data from/to the virtual disk 471 held in the storage device 44. At the start-up of the Guest OS program 461, the configuration file of the Guest OS program 461 stored in the virtual disk 471 is read out, and the operating mode and the like of the Guest OS program are set.

The Guest OS programs 461 and 462 include interface mapping means (which is described later). The interface mapping means configures a virtual NIC(s) of a virtual machine based on the configuration file of the interface mapping means. The configuration file of the interface mapping means is stored in the virtual disk. Details of the interface mapping means are explained later.

The program 461 and 462 on the VM is the OS of the virtual machine, and an application program(s) can be executed on the OS of the virtual machine. Note that an ordinary program may be used for this application program, and therefore its graphical illustration and detailed explanation are omitted here for simplifying the explanation. Note that although only two programs 461 and 462 are shown as the programs on the VM in FIG. 3, the number of the programs on the VM may be one or more than two.

Note that the processing unit 43 executes each of the above-described programs on the storage device 44. To illustrate this relation, the connection between the processing unit 43 and each program is indicated by dotted lines in FIG. 3. Further, to execute each of the above-described programs, the processing unit 43 also executes the operating system, which serves as the base of these programs. However, an ordinary program may be used for the operating system, and therefore its graphical illustration and detailed explanation are omitted here for simplifying the explanation.

Each of the virtual disks 471 and 472 stored in the storage device 44 corresponds to a disk drive apparatus in a physical server. The access from a program running on a virtual machine to a virtual disk is performed under control of the virtualization control program 451.

With the control using the virtualization control program 451, the program 461 on the VM can access only the virtual disk 471 while the program 462 on the VM can access only the virtual disk 472. Although one virtual disk is associated with one virtual machine in FIG. 3, more than one virtual disk may be associated with one virtual machine.

Further, in a logical sense, data reading and writing are performed between the programs 461 and 462 on the VM and the virtual disks 471 and 472. Therefore, FIG. 3 shows an embodiment in which data reading and writing are performed directly between the programs 461 and 462 and the virtual disks 471 and 472 for the sake of simplification.

<Operation of Physical Node>

Next, an operation of the physical node 21 is explained with reference to FIGS. 4 to 7. Note that as explained above, ordinary programs may be used for the Guest OS programs 461 and 462 as well as for the virtualization control program 451. Therefore, detailed explanation of their operations is omitted here, and only the operation of the node management program 440 is explained.

In order to implement each of the above-described functions, the node management program 440 includes a virtual node definition interpretation processing unit 441, a resource allocation processing unit 442, a VM parameter generation processing unit 443 (virtual machine parameter generating means), a VM assignment result reply processing unit 444, and a virtual disk operation processing unit 445 (virtual disk manipulating means). Each of the processing units is explained hereinafter one by one.

<Operation of Physical Node: Physical Node Definition Interpretation Unit>

The virtual node definition interpretation processing unit 441 receives a virtual node assignment request from the domain management apparatus 11 through the physical NIC 41. Upon receiving the request, the virtual node definition interpretation processing unit 441 interprets the definition of the virtual node to which the assignment is requested. Then, the virtual node definition interpretation processing unit 441 converts the definition of the requested virtual node into a data structure that can be used in the subsequent processes, and sends the converted definition to the resource allocation processing unit 442. Note that the virtual node definition according to this exemplary embodiment is not limited to any particular data formats, and ordinary data formats may be used. Therefore, detailed explanation of the data format is omitted here.

<Operation of Physical Node: Resource Allocation Processing Unit>

When the resource allocation processing unit 442 receives the data-converted virtual node definition from the virtual node definition interpretation processing unit 441, it allocates resources in the physical node 21. An operation of the resource allocation processing unit 442 is explained hereinafter in a more detailed manner with reference to a flowchart shown in FIG. 4.

Firstly, when the resource allocation processing unit 442 receives a virtual node definition, it checks the availability of the physical resources (e.g., the number of CPUs, processing time ratios, or work areas) that can be allocated to a virtual machine (S1001). Next, the resource allocation processing unit 442 determines whether the resource required for a virtual machine for the virtual node can be allocated or not (S1002). If the allocation is possible (Yes at S1002), the resource allocation processing unit 442 sends the virtual node definition and the amount of the allocated physical resource to the VM parameter generation processing unit 443 (S1003).

Note that the virtual node definition that is sent from the resource allocation processing unit 442 to the VM parameter generation processing unit 443 contains information (e.g., identifier) of the virtual interface(s) (hereinafter, also referred to as "virtual IF") assigned to the virtual node. When the virtual node definition includes information of a plurality of virtual IFs, the information is written in such a format that the plurality of virtual IFs are written in succession in this exemplary embodiment in consideration of the processing efficiency and the simplicity. However, the information of the plurality of virtual IFs may be included in the virtual node definition by using any other formats.

If the resource allocation is impossible (No at S1002), the resource allocation processing unit 442 notifies the VM parameter generation processing unit 443 that the resource to be allocated cannot be secured (S1004). In this manner, the resource allocation processing unit 442 notifies the resource allocation result to the VM parameter generation processing unit 443 even when the resource cannot be allocated.

<Operation of Physical Node: VM Parameter Generation Processing Unit>

When the VM parameter generation processing unit 443 receives the resource allocation result, it generates VM parameters based on the resource allocation result, instructs the virtual disk operation processing unit 445, and notifies the allocation result to the VM assignment result reply processing unit 444. An operation of the VM parameter generation processing unit 443 is explained hereinafter in a more detailed manner with reference to FIGS. 5 and 6.

Figure 5:
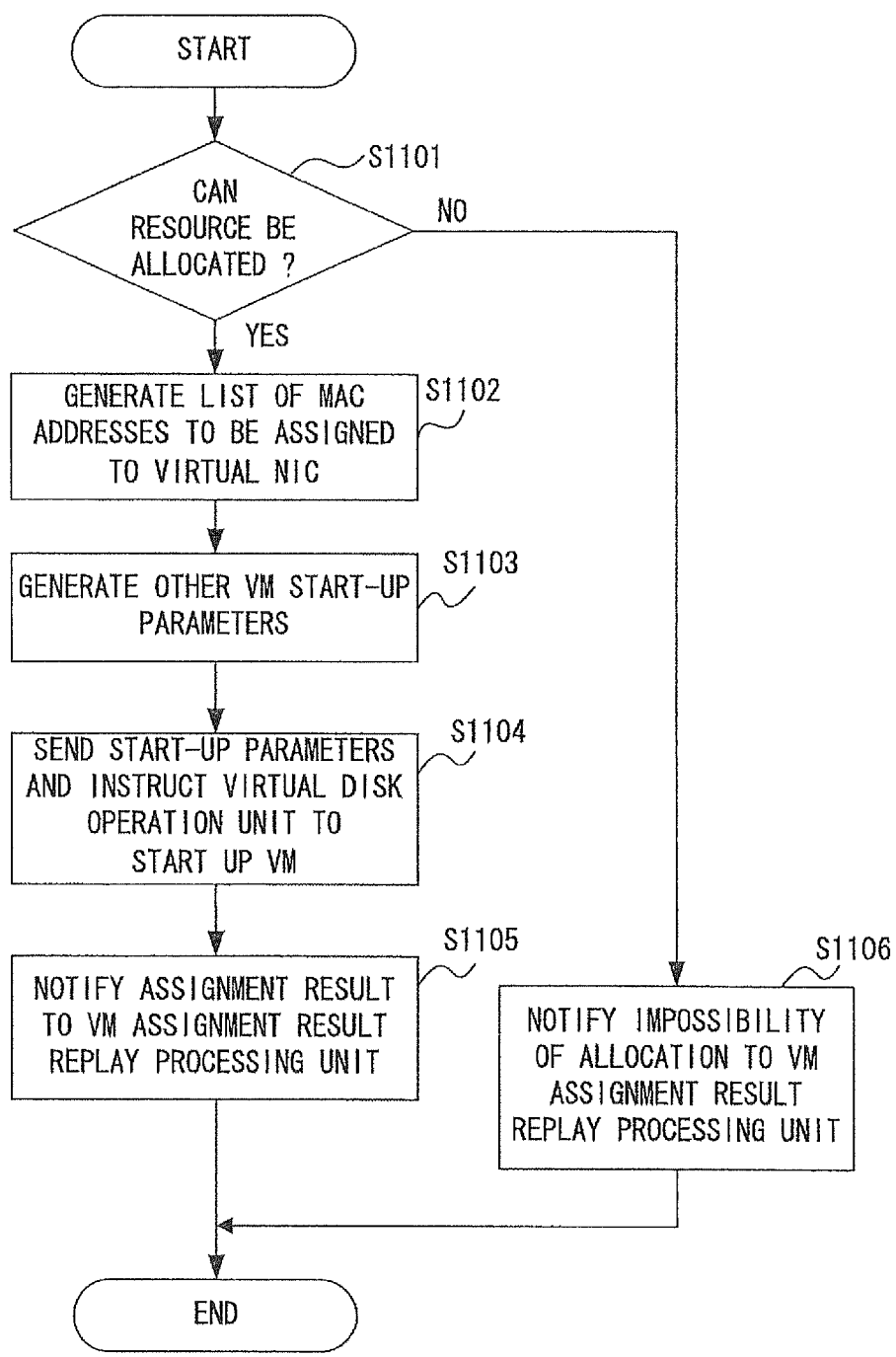
FIG. 5 shows an operation flow of a VM parameter generation unit according to a first exemplary embodiment of the present invention.

FIG. 5 is a flowchart showing an example of an operation of the VM parameter generation processing unit 443.

Firstly, upon receiving the allocation result from the resource allocation processing unit 442, the VM parameter generation processing unit 443 checks whether the resource allocation has succeeded or not (S1101). If the allocation is possible (Yes at S1101), the VM parameter generation processing unit 443 determines, for each of the virtual interfaces defined in the virtual node definition received from the resource allocation processing unit 442, a MAC address to be assigned to a virtual NIC corresponding to the virtual interface (hereinafter, a MAC address to be assigned to a virtual NIC may be simply referred to as "virtual MAC address") (S1102).

When a plurality of virtual interfaces is defined in the virtual node definition, it is necessary to assign a virtual MAC address to each of the plurality of virtual NICs. In the present invention, the only requirement for virtual MAC addresses is that they have to be unique from each other among a plurality of virtual NICs of one virtual machine. Needless to say, when a plurality of virtual machines operates within the physical node 21, the MAC addresses to be assigned to the virtual NICs of the plurality of virtual machines may be defined so that they are unique from each other within the physical node 21.

As a result of the step S1102, a list of pairs each consisting of a virtual interface and its corresponding virtual MAC address for each virtual interface defined in the virtual node definition is obtained (hereinafter, this list is simply referred to as "virtual MAC address correspondence table")

FIG. 6 is an example of a virtual MAC address correspondence table. Each entry in the virtual MAC address correspondence table is composed of a pair of a virtual interface identifier and a virtual MAC address. Note that in FIG. 6, although the virtual interface identifier is used as information capable of identifying the virtual interface, any other information capable of identifying the virtual interface may be also used. Further, the number of entries in the virtual MAC address correspondence table is equal to the number of the virtual interfaces defined in the virtual node definition.

Next, the VM parameter generation processing unit 443 generates start-up parameters (VM start-up parameters) based on the generated virtual MAC address(es) and the virtual node definition (S1103). The start-up parameters (VM start-up parameters) are used by the virtualization control program 451 in order to start up the virtual machine. The VM start-up parameters include the list of virtual MAC addresses obtained in the step S1102.

Note that instead of including the list of virtual MAC addresses into VM start-up parameters generated by the VM parameter generation processing unit 443, information of the virtual MAC addresses may be generated from the virtual MAC address correspondence table and included into the VM start-up parameters when the virtual disk operation processing unit 445 sends the VM start-up parameters to the virtualization control program 451 (which is explained later).

The VM parameter generation processing unit 443 sends the generated start-up parameters and the virtual MAC address correspondence table to the virtual disk operation processing unit 445 (S1104). In this point, the VM parameter generation processing unit 443 according to this exemplary embodiment instructs the virtual disk operation processing unit 445 in order to carry out the subsequent process without waiting for a reply from the virtual disk operation processing unit 445. However, the VM parameter generation processing unit 443 may receive a reply from the virtual disk operation processing unit 445 simultaneously with the below-explained process so that the VM parameter generation processing unit 443 may retry the operation when, for example, an error has occurred.

Next, the VM parameter generation processing unit 443 sends the virtual node assignment result to the VM assignment result reply processing unit 444 (S1105). Note that the VM parameter generation processing unit 443 may first send the virtual node assignment result to the VM assignment result reply processing unit 444, and then send the generated start-up parameters and the virtual MAC address correspondence table to the virtual disk operation processing unit 445 and thereby provide an instruction about the start-up of the virtual machine. That is, the VM parameter generation processing unit 443 may performs the steps S1105 and S1104 in the reversed order.

Note that if the allocation result from the resource allocation processing unit 442 indicates that the allocation is impossible (No at S1101), the VM parameter generation processing unit 443 notifies the VM assignment result reply processing unit 444 that the virtual node assignment has not succeeded (S1106).

With the operation like this, the VM parameter generation processing unit 443 performs the instruction to the virtual disk operation processing unit 445, the subsequent instruction to start up the virtual machine using the virtualization control program 451, and the notification of the result to the VM assignment result reply processing unit 444.

<Operation of Physical Node: VM Assignment Result Reply Processing Unit>

When the VM assignment result reply processing unit 444 receives the assignment result, it returns the virtual node assignment result to the domain management apparatus 11 through the physical NIC 41. With this operation, the node management program 440 secures the resource for the virtual network in the physical node 21.

<Operation of Physical Node: Virtual Disk Operation Processing Unit>

When the virtual disk operation processing unit 445 receives the VM parameters and the virtual MAC address correspondence table from the VM parameter generation processing unit 443, it prepares a virtual disk for the virtual machine to be started up, rewrites the virtual disk based on the virtual MAC address correspondence table, and instructs the virtualization control program 451 to start up the virtual machine. An operation of the virtual disk operation processing unit 445 is explained hereinafter in a more detailed manner with reference to a flowchart shown in FIG. 7.

Firstly, upon receiving the VM parameters and the virtual MAC address correspondence table from the VM parameter generation processing unit 443, the virtual disk operation processing unit 445 prepares a virtual disk for the virtual machine to be started up (S1201).

An ordinary method can be used for the preparation of the virtual disk, and an arbitrary method can be adopted in the present invention. For example, a pre-prepared virtual disk may be used as it is as a dedicated virtual disk for the virtual machine to be started up, or a virtual disk may be downloaded from a network. The storage device 44 that holds the prepared virtual disk may be any form of device that can be accessed from the physical node on which the node management program 440 is running, such as a storage device on the physical node (such as a storage) and a storage device on a network to which the physical node is connected.

Next, the virtual disk operation processing unit 445 opens the virtual disk prepared in the step S1201 (S1202). The virtual disk operation processing unit 445 checks whether the virtual disk has been successfully opened or not (S1203).

With regard to the success/failure of the opening of the virtual disk, when the data format of the virtual disk and the file system in the virtual disk are supported by the virtual disk operation processing unit 445, the virtual disk is successfully opened.

There are various methods of reading/writing data structures in virtual disks, and they may be used for the present invention. For example, a virtual disk may be opened by calling a program available in "libguestfs, tools for accessing and modifying virtual machine disk images" (http://libguestfs.org/) from the virtual disk operation processing unit 445. After opening the virtual disk, the virtual disk operation processing unit 445 can perform operations in the subsequent steps S1204 to S1206.

If the virtual disk is successfully opened (Yes at S1203), the virtual disk operation processing unit 445 checks whether the OS in the virtual disk has interface mapping means or not (S1204).

Before explaining the operation in the S1204 in detail, the interface mapping means is explained hereinafter. Regardless of the virtual machine or the physical machine, some of the recent OSs provide means for assigning predefined NIC names to NICs having specific MAC addresses. The rule that specifies in what kind of manner NIC names are assigned to NICs having MAC addresses is provided by using a configuration file stored in the OS start-up disk. One configuration file can contain a plurality of rules.

For example, when a rule specifying that an NIC name "mynic" is assigned to an NIC having a MAC address "AA:BB:CC:DD:EE:FF" is written in the configuration file, if there is an NIC having the MAC address "AA:BB:CC:DD:EE:FF" in the started-up machine, the NIC name "mynic" is assigned to the NIC having that MAC address. As a result, after the OS has been started up, that NIC can be referred to by using the NIC name "mynic".

Specific examples of the interface mapping means can be available in Reference URL and Reference URL2 shown below.

Reference URL1: "Writing udev rules", http://www.reactivated.net/writing_udev_rules.html#example-netif Reference URL2: "14.2. Interface Configuration Files", http://docs.redhat.com/docs/en-US/Red_Hat_Enterprise_Linux/5/html/Deployment_Guide/s1-networkscripts-interfaces.html There are several methods of determining whether a given OS provides an interface mapping means or not. One method is a method of checking the presence of a file specific to the OS and checking the version of the OS. If the version of the OS is determined, it is possible to determine whether interface mapping means is provided or not. Therefore, the most reliable method may be a method of checking the presence of a file specific to the OS and checking the version number contained in that file.

As another method, there is a method of checking the presence of an execution file that provides interface mapping means. Note that any other methods capable of checking whether interface mapping means is provided in the OS or not may be also used.

The virtual disk operation processing unit 445 can interpret the data format of the virtual disk and the file system in the virtual disk. The virtual disk operation processing unit 445 determines whether interface mapping means is provided in the OS stored in the virtual disk or not by referring to the file system in the virtual disk and using the above-mentioned interface mapping means determination method.

If the OS in the virtual disk provides interface mapping means (Yes at S1204), the virtual disk operation processing unit 445 performs writing into the configuration file of the interface mapping means based on the virtual MAC address correspondence table. Specifically, the virtual disk operation processing unit 445 writes, for each entry of the virtual MAC address correspondence table, a rule specifying that the virtual interface identifier is assigned to an NIC having the virtual MAC address of that entry as its NIC name into the configuration file of the interface mapping means (S1205).

When the writing of the NIC name assignment rules into the configuration file of the interface mapping means has been completed, the virtual disk operation processing unit 445 closes the opened virtual disk (S1206). Finally, the virtual disk operation processing unit 445 sends the VM parameters to the virtualization control program 451 and thereby provides instructions about the start-up of the virtual machine (S1207). With this, the explanation of the operation of the node management program 440 is finished.

Note that as described previously, the data format used in each unit of this exemplary embodiment is not limited to any particular formats. As a reference purpose, some examples of data are explained hereinafter with reference to FIGS. 8 to 13.

FIGS. 8 and 9 are examples of a configuration file of interface mapping means.

FIG. 8 is an example for use in the method disclosed in Reference URL1. This configuration file includes two interface mapping rules. As a first rule, a rule specifying that an NIC name "VIF-A0" is assigned to a virtual NIC having an NIC name "db:20:98:81:be:4b" as a virtual MAC address is written in the first line.

FIG. 9 is an example for use in the method disclosed in Reference URL2. In the method disclosed in Reference URL2, it is necessary to prepare an individual configuration file of interface mapping means for each virtual interface. In the example shown in FIG. 9, two configuration files, i.e., a configuration file for a virtual interface VIF-A0 and another configuration file for a virtual interface VIF-A1 are written. In this method, a virtual NIC name specified at "DEVICE" line is assigned to a virtual NIC having a virtual MAC address specified at "HWADDR" line.

FIG. 10 is an example of start-up parameters of a virtual machine that are created by the VM parameter generation processing unit 443. The start-up parameters change depending on the virtualization control program 451 to which the start-up parameters are notified. Therefore, the start-up parameters shown in FIG. 10 are merely an example, and the start-up parameters are not limited to the content of this example.

In the virtual machine start-up parameters 150 shown in FIG. 10, a virtual NIC definition 151 and a virtual NIC definition 152 defined for the virtual node are indicated by the areas enclosed by dotted-lines. In this example, the virtual MAC address is specified by using "nic.macaddr". For example, in the virtual NIC definition 151, it is defined as "nic.macaddr=db:20:98:81:be:4b". Other start-up parameters change depending on the virtualization control program 451 as described above, and therefore their detailed explanation is omitted here.

FIG. 11 is an example of an assignment result of the virtual network 2 that is returned from the VM assignment result reply processing unit 444 to the domain management apparatus 11. In the virtual network assignment result 144 shown in FIG. 11, an assignment result of the virtual node Node-A (virtual node information 145) is indicated by the area enclosed by a dotted-line. The assignment result shown in FIG. 11 should include at least information necessary for replying to the domain management apparatus 11. Therefore, FIG. 11 shows an ordinary assignment result, and detailed explanation of other information is omitted here.

FIG. 12 shows the area enclosed by the dotted-line in FIG. 11, i.e., an example of a virtual node assignment result (virtual node information 145). Comparing the result shown in FIG. 12 with the result shown in FIG. 17, the assignment result shown in FIG. 12 does not include any virtual interface information corresponding to the virtual interface information 142 and 143 included in the assignment result shown in FIG. 17.

With these operations, the physical node 21 allocates physical resources to the virtual machine assigned to the virtual node. Further, with these operations, the network virtualization system 1 including the physical node 21 according to this exemplary embodiment can allocate resources of the physical network to the virtual networks 2 and 3. Note that although detailed explanation is omitted in this exemplary embodiment, the domain management apparatus 11 also provides similar instructions to the physical nodes 21 to 26 about the virtual links and thereby secures resources for the virtual links.

Finally, an operation of the Guest OS program 461 is explained.

When the virtual machine is started up under instructions from the virtualization control program 451, the Guest OS program 461 starts the start-up operation, reads out the configuration file of the Guest OS program 461 held in the virtual disk 471, and sets the operating mode and the like of the Guest OS program 461.

When the Guest OS program 461 provides interface mapping means, the interface mapping means is called during the start-up process of the Guest OS program and the NIC names of the virtual NICs of the virtual machine are defined based on the configuration file of the interface mapping means held in the virtual disk 471.

The virtual disk operation processing unit 445 has already written the rules about the NIC names of the virtual NICs on the virtual machine into the configuration file of the interface mapping means of the Guest OS program 461. That is, the rules specifying that the virtual interface identifiers are assigned as the NIC names of the virtual NICs have been already written in the configuration file of the interface mapping means. A virtual interface identifier is defined by using a virtual node definition. Further, if there is a virtual MAC address on the virtual machine corresponding to that virtual interface identifier, the virtual interface identifier is assigned to the virtual NIC on the virtual machine having that virtual MAC address as the NIC name of that virtual NIC.

Therefore, when the start-up of the Guest OS program 461 has been completed, the NIC name of the virtual NIC corresponding to the virtual interface becomes the virtual interface identifier.

Accordingly, the Guest OS program 461 and application programs running on the Guest OS program 461, which are programs running on the virtual machine assigned to the virtual node, can specify the virtual NIC corresponding to the virtual interface by using the virtual interface identifier defined in the virtual node definition without referring to the virtual network assignment result.

First Example

Figure 14:
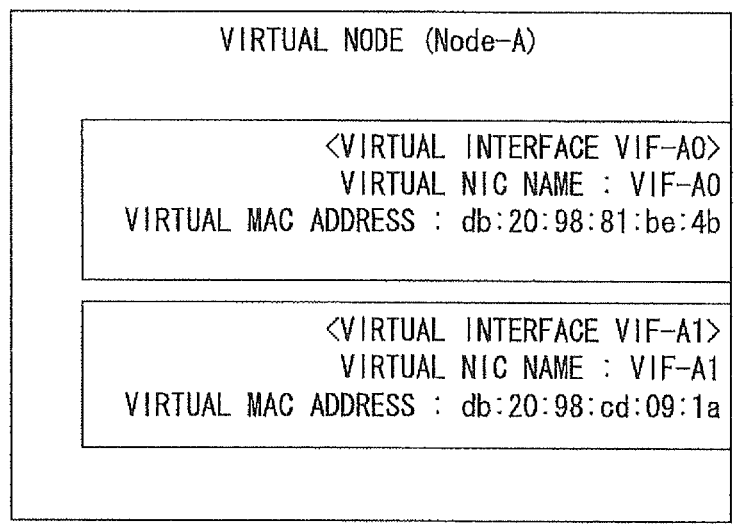
FIG. 14 shows a virtual NIC of a virtual machine corresponding to a virtual node "Node-A" according to a first exemplary embodiment of the present invention.
Figure 15:
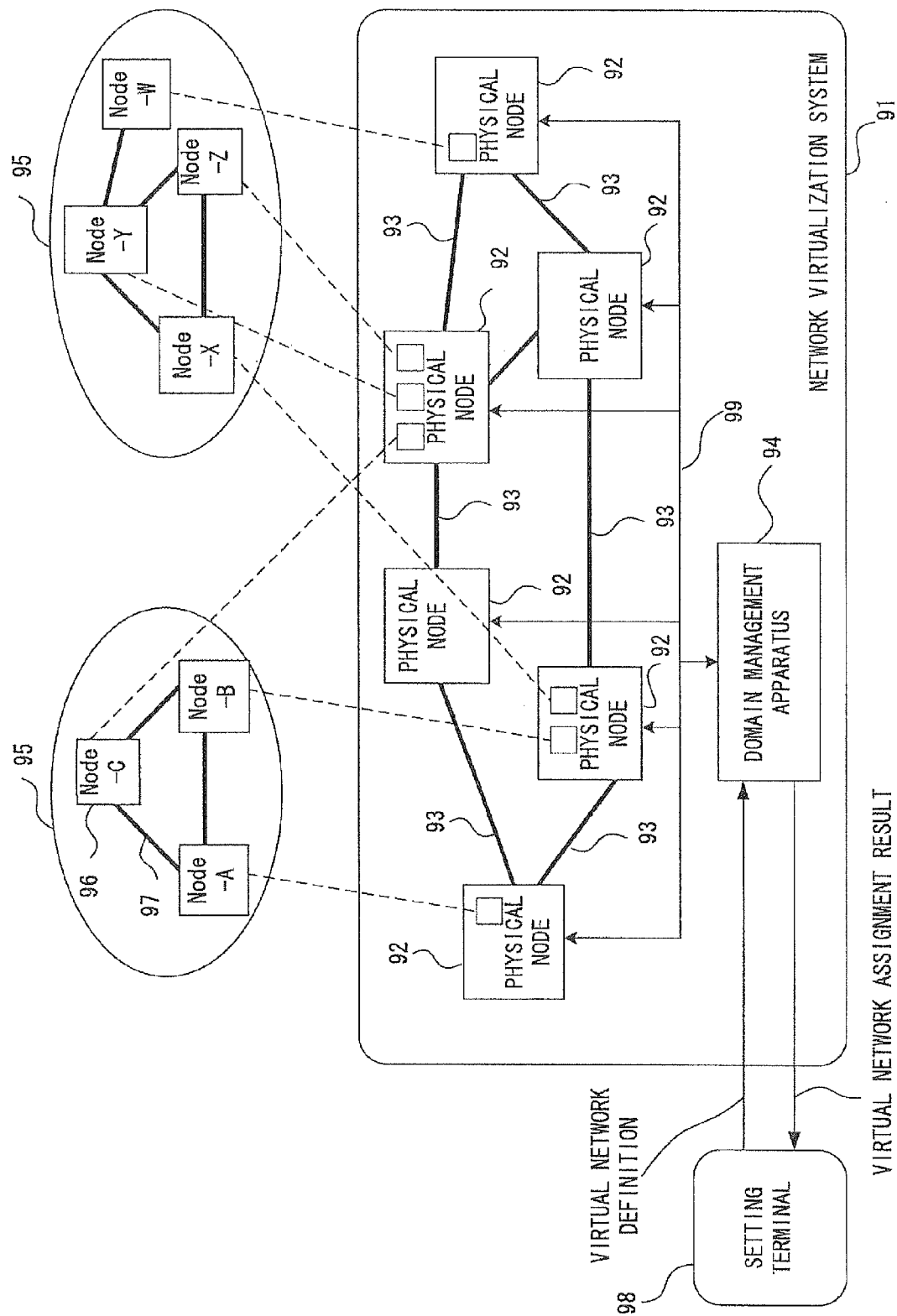
FIG. 15 is a block diagram showing a typical network system.

Next, a first example according to this exemplary embodiment of the present invention is explained with reference to FIGS. 13 and 14. Note that the configuration and the operation of a network virtualization system 1 according to the first example are equivalent to those of the first exemplary embodiment. Therefore, detailed explanation of the configuration and the operation that are equivalent to those of the first exemplary embodiment may be omitted as appropriate, and the following explanation is made with a particular emphasis on the configuration and operation that are unique to the first example.

Firstly, the assumptions for this example are summarized.

The definition shown in FIG. 16 is used as the virtual network definition of this example. The uppermost one (Node-A) of the three virtual node definitions shown in FIG. 16 is used as the virtual node definition of this example.

The physical node to be processed is the physical node 21 shown in FIG. 3. That is, the domain management apparatus 11 determines to secure resources of "Node-A" by using the physical node 21 based on the virtual network definition shown in FIG. 16 and sends the virtual node definition shown in FIG. 13 to the physical node 21. Note that two virtual IFs (VIF-A0 and VIF-A1) are specified in "Node-A" shown in FIG. 13.

Further, the list in FIG. 10 is used as the start-up parameter with which the virtual machine is started up. Assume that the virtual network assignment result has values shown in FIG. 12. Assume also that the resources for the virtual network are able to be secured in the explanation of this example.

Further, assume that Guest OS that is started up on the virtual machine provides interface mapping means. Assume also that the provided interface mapping means uses the method disclosed in Reference URL1. Assume also that the virtual disk operation processing unit 445 can interpret the data structure of the virtual disk corresponding to the virtual machine and can open the virtual disk.

Next, an operation of the network virtualization system 1 according to this example is explained.

When the setting terminal 31 requests the domain management apparatus 11 to configure the virtual network 2 (FIG. 16), the domain management apparatus 11 checks the definition 13 of the requested virtualized network and thereby determines to secure the resources for the virtual node(s) and the virtual link(s) by using the physical node 21. The domain management apparatus 11 transmits the virtual node definition (FIG. 13) to the physical node 21 in order to secure the resources.

The node management program 440 of the physical node 21 receives the virtual node definition (FIG. 13) through the physical NIC 41, secures the resources, and returns the virtual network assignment result (FIG. 11) to the domain management apparatus 11 through the physical NIC 41. An operation of each unit of the node management program 440 is explained hereinafter in a more detailed manner.

The virtual node definition interpretation processing unit 441 converts the virtual node definition received through the physical NIC 41 into an internal expression format used by the node management program 440 and sends the converted virtual node definition to the resource allocation processing unit 442.

The resource allocation processing unit 442 allocates physical resources of the physical node 21 based on the received virtual node definition and sends the amount of the secured physical resources to the VM parameter generation processing unit 443.

The VM parameter generation processing unit 443 determines, for the virtual interface(s) defined in the virtual node definition, a MAC address(s) of a virtual NIC(s) of the virtual machine that is assigned so as to correspond to the virtual interface(s), and generates start-up parameters for the start-up of the virtual machine. Assume that as a result of this process, the virtual MAC address correspondence table shown in FIG. 6 is generated. The VM parameter generation processing unit 443 first sends the VM start-up parameters and the virtual MAC address correspondence table to the virtual disk operation processing unit 445, and then notifies the virtual node assignment result to the VM assignment result reply processing unit 444.

The VM assignment result reply processing unit 444 returns the virtual node assignment result (FIG. 12) to the domain management apparatus 11 through the physical NIC 41. The domain management apparatus 11 receives the virtual node assignment result (FIG. 11) from the physical node 21.

The domain management apparatus 11 secures the resources for all of the requested virtual networks in a similar manner. When the domain management apparatus 11 has completed the configurations of all the virtual networks requested from the setting terminal 31, it notifies the virtual network assignment results to the setting terminal 31.

In the physical node 21, the following operations are performed in parallel with the notification of the virtual node assignment result from the node management program 440 to the domain management apparatus 11.

Figure 7:
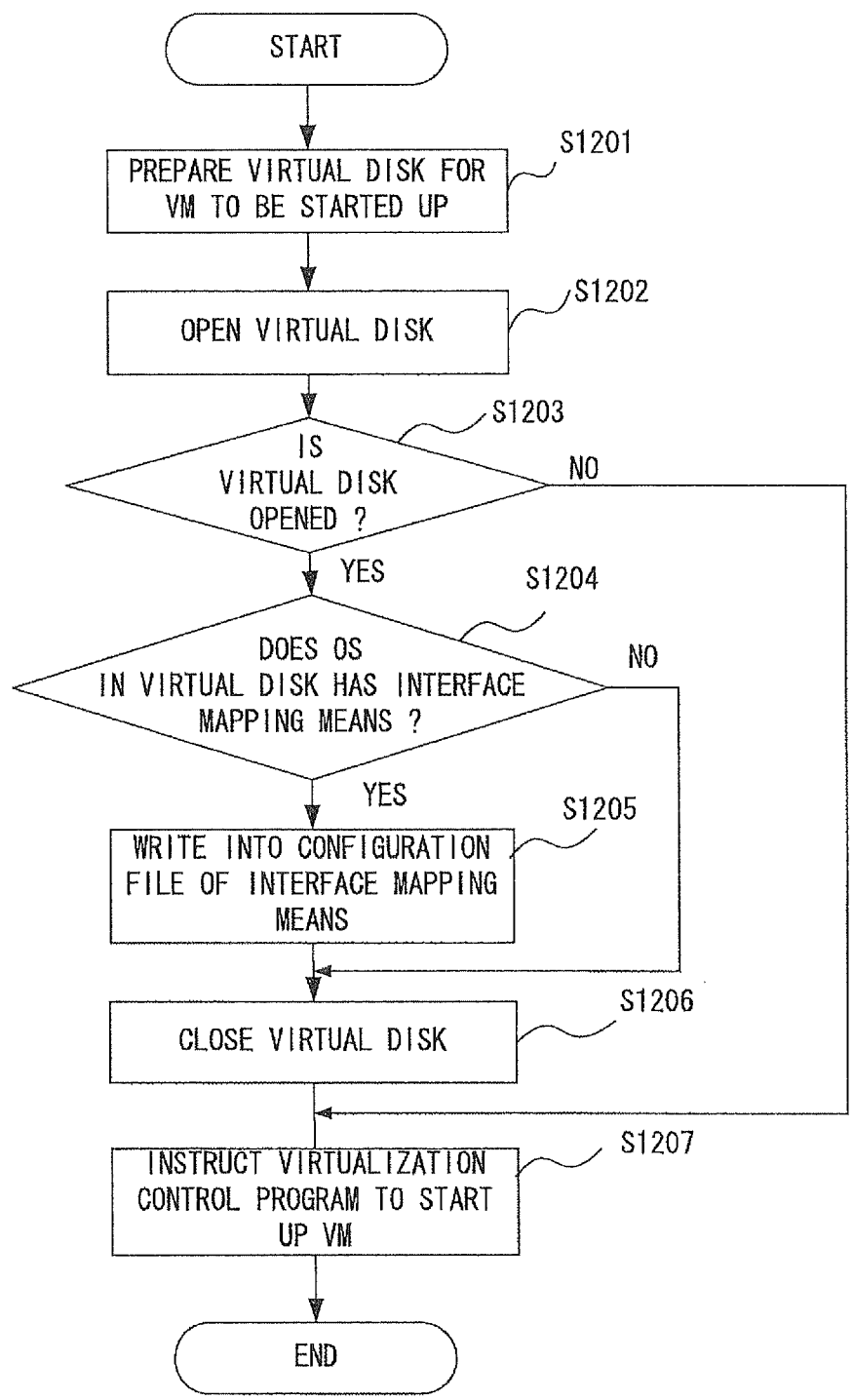
FIG. 7 shows an operation flow of a virtual disk control unit according to a first exemplary embodiment of the present invention.

The operation that is performed when the VM start-up parameters and the virtual MAC address correspondence table are sent from the VM parameter generation processing unit 443 to the virtual disk operation processing unit 445 is explained with reference to the above-explained FIG. 7. Note that in FIG. 7, the virtual disk 471 corresponding to the virtual machine to be started up has such a format that the virtual disk can be opened by the virtual disk operation processing unit 445. Therefore, the decision at the step S1203 becomes "Yes" and the process proceeds to the step S1204.

When the Guest OS program 461 provides interface mapping means, it is possible to determine that the OS in the virtual disk has interface mapping means by, for example, examining the Guest OS version number stored in a file that is held in the virtual disk 471 and is specific to the Guest OS (Yes at S1204).

In the step S1205, an interface mapping rule(s) is created based on the virtual MAC address correspondence table shown in FIG. 6, and the created interface mapping rule(s) is written into the configuration file of the interface mapping means stored in the virtual disk 471. As a result, the configuration file shown in FIG. 8 is obtained.

Next, the virtual disk operation processing unit 445 closes the virtual disk 471. After that, the virtual disk operation processing unit 445 sends the VM start-up parameters shown in FIG. 10 to the virtualization control program 451 and thereby provides the start-up instruction of the virtual machine.

The virtualization control program 451 starts up the virtual machine based on the start-up parameters shown in FIG. 10. On the virtual machine, the Guest OS program 461 starts to be executed.

The virtual machine on which the Guest OS program 461 is running is started up with the start-up parameters shown in FIG. 10. Therefore, the virtual machine has two virtual NICs and the MAC addresses of these virtual NICs are "db:20:98:81:be:4b" and "db:20:98:cd:09:1a" respectively.

The configuration file of the interface mapping means has become the one shown in FIG. 8. Therefore, the interface mapping means assigns an NIC name "VIF-A0" to the virtual NIC having the MAC address "db:20:98:81:be:4b" and assigns an NIC name "VIF-A1" to the virtual NIC having the MAC address "db:20:98:cd:09:1a". That is, the virtual NICs of the virtual machine on which the Guest OS program 461 is running are expressed as shown in FIG. 14.

With the above-described operations, it is ensured that the virtual NICs "VIF-A0" and "VIF-A1" of the virtual machine on which the Guest OS program 461 is running correspond to the virtual interfaces VIF-A0 and VIF-A1, respectively, defined in the virtual node definition.

Therefore, application programs running on the Guest OS programs 461 and 462, which are programs running on the virtual machine assigned to the virtual node, can specify the virtual NICs corresponding to the virtual interfaces by using the virtual interface identifiers VIF-A0 and VIF-A1 defined in the virtual node definition without referring to the virtual network assignment result.

Note that the operation of the Guest OS program 462 is substantially the same as that of the Guest OS program 461 and therefore operates in a similar manner to the Guest OS program 461.

In this manner, the network virtualization system 1 according to the first example can provide similar advantageous effects to those of the first exemplary embodiment.

Note that it is conceivable to identify virtual interfaces by determining all or some of the MAC addresses to be assigned to respective NICs of the virtual machine based on the port names (interface names) of the node specified by using the virtual network definition and by determining the correspondence relation between the virtual interface names and the MAC addresses assigned to the virtual NICs in the virtual machine in the creation of the virtual machine at the time of resource allocation. This method can be applied regardless of the type of the OS running on the virtual machine.

In contrast to this, in the present invention, the configuration file of the means for assigning a predefined name to an NIC having a specific MAC address (interface mapping means) that is provided by the OS running on the virtual machine is set on the host OS side before the start-up of the virtual machine. Therefore, "virtual interface names written in the virtual network definition" is assigned as the names of the virtual NICs that are recognized in the virtual machine, making it possible to identify virtual interfaces. In this way, though depending on the OS running on the virtual machine, there is no need for any determination logic in the virtual machine.

Note that the present invention is not limited to the above-described exemplary embodiments, and various modifications can be made without departing from the spirit and scope of the present invention.

This application is based upon and claims the benefit of priority from Japanese patent application No. 2010-291500, filed on Dec. 28, 2010, the disclosure of which is incorporated herein in its entirety by reference.

REFERENCE SIGNS LIST

1 NETWORK VIRTUALIZATION SYSTEM
2, 3 VIRTUAL NETWORK
4 NETWORK SYSTEM
11 DOMAIN MANAGEMENT APPARATUS
13 VIRTUAL NETWORK DEFINITION
131 to 133 VIRTUAL NODE DEFINITION
14 VIRTUAL NETWORK ASSIGNMENT RESULT
140 VIRTUAL NETWORK DEFINITION INFORMATION
141 VIRTUAL NODE IDENTIFIER
142, 143 VIRTUAL INTERFACE INFORMATION
144 VIRTUAL NETWORK ASSIGNMENT RESULT
145 VIRTUAL NODE INFORMATION
150 VIRTUAL MACHINE START-UP PARAMETER
151, 152 VIRTUAL NIC DEFINITION
21 to 26 PHYSICAL NODE
31 SETTING TERMINAL
51 PHYSICAL LINK
61 SETTING PATH
71 to 73 VIRTUAL NODE
81 to 83 VIRTUAL LINK
41, 42 PHYSICAL NIC
43 PROCESSING UNIT
44 STORAGE DEVICE
440 NODE MANAGEMENT PROGRAM
441 VIRTUAL NODE DEFINITION INTERPRETATION PROCESSING UNIT
442 RESOURCE ALLOCATION PROCESSING UNIT
443 VM PARAMETER GENERATION PROCESSING UNIT
444 VM ASSIGNMENT RESULT REPLY PROCESSING UNIT
445 VIRTUAL DISK OPERATION PROCESSING UNIT
451 VIRTUALIZATION CONTROL PROGRAM
461, 462 Guest OS PROGRAM
471, 472 VIRTUAL DISK
91 NETWORK VIRTUALIZATION SYSTEM
92 PHYSICAL NODE
92 PHYSICAL LINK
94 DOMAIN MANAGEMENT APPARATUS
95 VIRTUAL NETWORK
96 VIRTUAL NODE
97 VIRTUAL LINK
98 SETTING TERMINAL

The invention claimed is:

1. A network virtualization system comprising:
a physical node having a memory constituting a network; and
a domain management apparatus that instructs the physical node about a configuration of a virtual node and a virtual link of a virtual network in order to allocate a resource in the physical node,
wherein when the physical node assigns a virtual machine to the virtual node based on a definition of the virtual node contained in an instruction from the domain management apparatus, the physical node writes a configuration associating a check result indicating that the resource can be allocated, information contained in the virtual node definition, and information about the virtual machine into a configuration file of an operating system to be started up on the virtual machine before start-up of the virtual machine and, after that, starts up the virtual machine,
wherein the physical node:
associates a virtual network interface card (NIC) of the virtual machine with each of a virtual interface included in the virtual node definition one by one as information included in the virtual node definition;
assigns a value to a media access control (MAC) address of the virtual network interface card (NIC) as information about the virtual machine, the value being unique at least within the virtual machine; and
writes a rule associating the virtual interface included in the virtual node definition with a media access control (MAC) address assigned to the virtual network interface card (NIC) of the virtual machine into a configuration file of an interface mapping unit of an operating system to be started up on the virtual machine in a virtual disk of the virtual machine before start-up of the virtual machine and, after that, starts up the virtual machine.

2. The network virtualization system according to claim 1, wherein the physical node writes a rule specifying that an identifier of the virtual interface included in the virtual node definition is assigned as a network interface card (NIC) name of a virtual network interface card (NIC) having a media access control (MAC) address assigned to the virtual network interface card (NIC) of the virtual machine into a configuration file of the interface mapping unit.

3. The network virtualization system according to claim 2, wherein when the physical node is to perform writing into the configuration file of the interface mapping unit, the physical node checks whether there is a file specific to an operating system to be started up on the virtual machine as a file within a virtual disk of the virtual machine or not, or whether there is an execution file of the interface mapping unit or not, and only when there is the file or the execution file, performs writing into the configuration file of the interface mapping unit.

4. The network virtualization system according to claim 1, wherein when the physical node is to perform writing into the configuration file of the interface mapping unit, the physical node checks whether there is a file specific to an operating system to be started up on the virtual machine as a file within a virtual disk of the virtual machine or not, or whether there is an execution file of the interface mapping unit or not, and only when there is the file or the execution file, performs writing into the configuration file of the interface mapping unit.

5. The network virtualization system according to claim 1, the physical node recognizes a correspondence relationship between the virtual interface and the virtual NIC without referring to the virtual network assignment result and without waiting for the start-up of the virtual machine.

6. A physical node comprising:
virtual node definition interpretation unit stored in a memory that receives a virtual node assignment request and interpreting a definition of the assignment-requested virtual node;
resource allocation unit that receives a result from the virtual node definition interpretation unit, checking a resource to be allocated to the virtual node in order to allocate the resource in the physical node, and assigning a virtual machine;
virtual machine parameter generating unit that assigns a value to a media access control (MAC) address of a virtual network interface card (NIC) of the virtual machine, the value being unique at least within the virtual machine;
virtual disk manipulating unit that writes a configuration associating a check result indicating that the resource can be allocated, information contained in the virtual node assignment request, and information about the virtual machine into a configuration file of an operating system to be started up on the virtual machine before start-up of the virtual machine, the configuration file being stored in a virtual disk of the virtual machine; and
virtual machine monitor unit that performs execution control of the virtual machine, wherein:
the virtual node definition interpretation unit receives a virtual node assignment request including a definition of a virtual interface held by a virtual node and interprets a definition of the assignment-requested virtual node,
the resource allocation unit receives a result from the virtual node definition interpretation unit, checks a resource to be allocated to the virtual node, and assigns a virtual machine to the virtual node,
the virtual machine parameter generation processing unit associates a virtual network interface card (NIC) of the virtual machine with each of the virtual interface included in the virtual node assignment request one by one, and assigns a value to a media access control (MAC) address of the virtual network interface card network interface card (NIC), the value being unique at least within the virtual machine,
the virtual disk manipulating unit writes a rule associating the virtual interface included in the virtual node assignment request with a media access control (MAC) address assigned to the virtual network interface card (NIC) of the virtual machine into a configuration file of interface mapping unit of an operating system to be started up on the virtual machine before start-up of the virtual machine, and
the virtual machine monitor unit performs execution control of the virtual machine.

7. The physical node according to claim 6 recognizes a correspondence relationship between the virtual interface and the virtual NIC without referring to the virtual network assignment result and without waiting for the start-up of the virtual machine.

8. A virtual interface identification method in a virtual machine, the method comprising:
receiving, by a physical node constituting a network, a virtual node assignment request including a definition of a virtual interface held by a virtual node, and interpreting the definition of the assignment-requested virtual node;
receiving, by the physical node, a result of the virtual node definition interpretation, checking a resource to be allocated to the virtual node in order to allocate the resource in the physical node, and assigning a virtual machine;
associating, by the physical node, a virtual network interface card (NIC) of the virtual machine with each of the virtual interface included in the virtual node assignment request one by one, and assigning a value to a media access control (MAC) address of the virtual network interface card (NIC), the value being unique at least within the virtual machine; and
writing, by the physical node, a rule associating a check result indicating that the resource can be allocated, and the virtual interface included in the virtual node assignment request with a media access control (MAC) address assigned to the virtual network interface card (NIC) of the virtual machine into a configuration file of an interface mapping unit of an operating system to be started up on the virtual machine before start-up of the virtual machine, the configuration file being stored in a virtual disk of the virtual machine, wherein:
the physical node receives a virtual node assignment request including a definition of a virtual interface held by a virtual node and interprets a definition of the assignment-requested virtual node,
the physical node receives the result of the virtual node definition interpretation, checks a resource to be allocated to the virtual node, and assigns a virtual machine to the virtual node,
the physical node associates a virtual network interface card (NIC) of the virtual machine with each of the virtual interface included in the virtual node assignment request one by one, and assigns a value to a media access control (MAC) address of the virtual network interface card network interface card (NIC), the value being unique at least within the virtual machine,
the physical node writes a rule associating the virtual interface included in the virtual node assignment request with a media access control (MAC) address assigned to the virtual network interface card (NIC) of the virtual machine into a configuration file of an interface mapping unit of an operating system to be started up on the virtual machine before start-up of the virtual machine, and
the physical node performs execution control of the virtual machine.

9. The virtual interface identification method according to claim 8, further comprising recognizing, by the physical node, a correspondence relationship between the virtual interface and the virtual NIC without referring to the virtual network assignment result and without waiting for the start-up of the virtual machine.

\* \* \* \* \*